United States Patent
Ota et al.

(10) Patent No.: US 12,366,694 B2
(45) Date of Patent: Jul. 22, 2025

(54) RETARDATION FILM AND METHOD FOR PRODUCING THE SAME

(71) Applicant: Osaka Gas Chemicals Co., Ltd., Osaka (JP)

(72) Inventors: Yoshiya Ota, Osaka (JP); Shinichi Kamei, Osaka (JP); Shinsuke Miyauchi, Osaka (JP)

(73) Assignee: OSAKA GAS CHEMICALS CO., LTD., Osaka (JP)

( * ) Notice: Subject to any disclaimer, the term of this patent is extended or adjusted under 35 U.S.C. 154(b) by 1064 days.

(21) Appl. No.: 17/265,569

(22) PCT Filed: Aug. 7, 2019

(86) PCT No.: PCT/JP2019/031017
§ 371 (c)(1),
(2) Date: Feb. 3, 2021

(87) PCT Pub. No.: WO2020/036101
PCT Pub. Date: Feb. 20, 2020

(65) Prior Publication Data
US 2021/0294013 A1    Sep. 23, 2021

(30) Foreign Application Priority Data
Aug. 17, 2018  (JP) .................................. 2018-153724

(51) Int. Cl.
| G02B 5/30 | (2006.01) |
| B29C 55/00 | (2006.01) |
| B29C 55/04 | (2006.01) |
| B29C 55/12 | (2006.01) |
| B29K 67/00 | (2006.01) |
| B29L 11/00 | (2006.01) |

(Continued)

(52) U.S. Cl.
CPC .......... G02B 5/3083 (2013.01); B29C 55/005 (2013.01); B29C 55/04 (2013.01);
(Continued)

(58) Field of Classification Search
None
See application file for complete search history.

(56) References Cited

U.S. PATENT DOCUMENTS 7,781,540 B2 *  8/2010  Yanagida ............ C08L 67/025
528/196
2008/0085955 A1  4/2008  Yanagida et al.
(Continued)

FOREIGN PATENT DOCUMENTS

JP  2003-43253   2/2003
JP  2007-24940   2/2007
(Continued)

OTHER PUBLICATIONS

International Preliminary Report on Patentability and Written Opinion of the International Searching Authority issued Feb. 23, 2021 in International (PCT) Application No. PCT/JP2019/031017.
(Continued)

Primary Examiner — Vivian Chen
(74) Attorney, Agent, or Firm — Wenderoth, Lind & Ponack, L.L.P.

(57) ABSTRACT

Provided are a retardation film that has a high heat resistance, has excellent formability and handleability even in a single-layer structure, has a negative thickness-direction retardation Rth value, and is suitable as a negative A-plate or a positive C-plate and a method for producing the film. The retardation film is formed of a stretched film of a polyester resin, contains a unit (A1) represented by the formula (1) as a diol unit (A) and a unit (B1) represented by the formula (2a) or (2b) as a dicarboxylic acid unit (B), and is a negative A-plate or a positive C-plate.

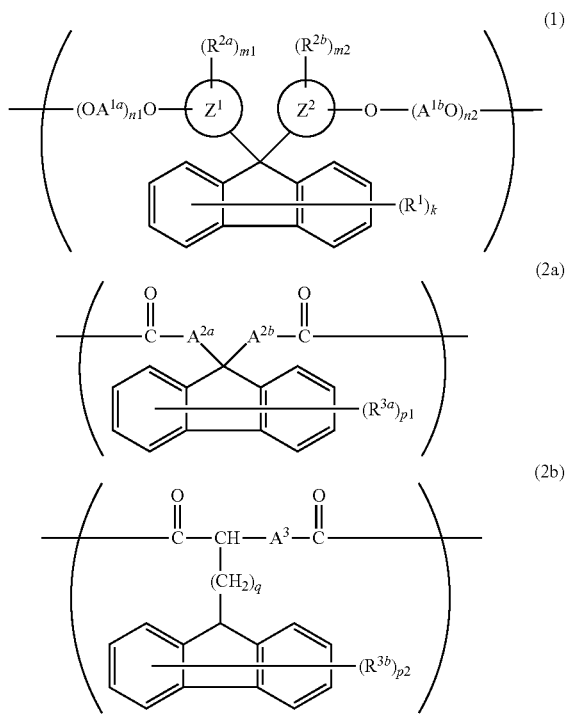

In the formulae, $Z^1$ and $Z^2$ represent an aromatic hydrocarbon ring, $R^1$, $R^{2a}$, $R^{2b}$, $R^{3a}$ and $R^{3b}$ represent a substituent, k, p1 and p2 denotes an integer of 0 to 8, q denotes an integer of 0 to 4, m1, m2, n1 and n2 denotes an integer of not less than 0, $A^{1a}$ and $A^{1b}$ represents an alkylene group, and $A^{2a}$, $A^{2b}$ and $A^3$ represents a divalent hydrocarbon group.

9 Claims, No Drawings

(51) Int. Cl.
- *B29L 31/34* (2006.01)
- *C08G 63/18* (2006.01)
- *C08G 63/181* (2006.01)
- *C08G 63/187* (2006.01)
- *C08G 63/189* (2006.01)
- *C08G 63/19* (2006.01)
- *C08G 63/197* (2006.01)
- *C08G 63/672* (2006.01)
- *C08G 63/83* (2006.01)
- *C08J 5/18* (2006.01)
- *G02B 1/04* (2006.01)
- *G02F 1/13363* (2006.01)

(52) U.S. Cl.
CPC .......... *B29C 55/12* (2013.01); *C08G 63/672* (2013.01); *C08G 63/83* (2013.01); *C08J 5/18* (2013.01); *B29K 2067/00* (2013.01); *B29L 2011/00* (2013.01); *B29L 2031/3475* (2013.01); *C08G 63/18* (2013.01); *C08G 63/181* (2013.01); *C08G 63/187* (2013.01); *C08G 63/189* (2013.01); *C08G 63/19* (2013.01); *C08G 63/197* (2013.01); *C08J 2367/02* (2013.01); *G02B 1/04* (2013.01); *G02F 1/13363* (2013.01); *G02F 1/133634* (2013.01); *G02F 1/133638* (2021.01); *G02F 2202/40* (2013.01); *G02F 2413/13* (2013.01); *G02F 2413/14* (2013.01)

(56) References Cited

U.S. PATENT DOCUMENTS

| | | | | |
|---|---|---|---|---|
| 2012/0170118 A1* | 7/2012 | Wang | ............... | C07C 57/50 562/466 |
| 2013/0038934 A1* | 2/2013 | Imamura | ............. | G02B 27/286 359/489.02 |
| 2013/0163082 A1* | 6/2013 | Tamada | ............. | G02B 5/3016 359/489.07 |
| 2016/0003995 A1 | 1/2016 | Nakazawa et al. | | |
| 2016/0025911 A1* | 1/2016 | Tamada | ............. | G02F 1/133528 156/247 |
| 2016/0062020 A1* | 3/2016 | Kogure | ............... | G02B 5/3083 359/489.07 |
| 2018/0231844 A1 | 8/2018 | Sakai et al. | | |
| 2020/0033523 A1* | 1/2020 | Yoshimura | ........... | G02B 5/3083 |
| 2021/0147619 A1* | 5/2021 | Satake | ................. | C08G 63/06 |
| 2022/0276424 A1* | 9/2022 | Koo | .................... | G02B 5/305 |
| 2023/0091159 A1* | 3/2023 | Ota | ..................... | C08G 63/193 428/213 |

FOREIGN PATENT DOCUMENTS

| | | | |
|---|---|---|---|
| JP | 2012-22148 | | 2/2012 |
| JP | 2013-64118 | | 4/2013 |
| JP | 2013-064118 A | * | 4/2013 |
| JP | 2014-149508 | | 8/2014 |
| JP | 2014-218645 | | 11/2014 |
| JP | 2014-218645 A | * | 11/2014 |
| JP | 2015-218265 | | 12/2015 |
| JP | 2015-218265 A | * | 12/2015 |
| JP | 2015-230415 | | 12/2015 |
| JP | 2015-230415 A | * | 12/2015 |
| JP | 2016-69643 | | 5/2016 |
| JP | 2016-069643 A | * | 5/2016 |
| JP | 2017-75256 | | 4/2017 |
| JP | 2017-198956 | | 11/2017 |
| JP | 2017-198956 A | * | 11/2017 |
| KP | 10-2007-0039544 | | 4/2007 |
| WO | 2014/148327 | | 9/2014 |
| WO | 2017/022623 | | 2/2017 |

OTHER PUBLICATIONS

Request for the Submission of an Opinion issued Nov. 23, 2022 in corresponding Korean Patent Application No. 10-2021-7005874, with English language translation.

International Search Report (ISR) issued Oct. 15, 2019 in International (PCT) Application No. PCT/JP2019/031017.

* cited by examiner

RETARDATION FILM AND METHOD FOR PRODUCING THE SAME

TECHNICAL FIELD

The present invention relates to a retardation film, and more particularly, to a retardation film having a negative intrinsic birefringence and a method for producing the same.

BACKGROUND ART

Liquid crystal display devices such as a liquid crystal display (LCD) use a retardation film for the purpose of preventing reduction in contrast or change in color due to a viewing angle (optical compensation or viewing angle compensation). As a material of such a retardation film, widely used is a polymer material having a positive intrinsic birefringence (a positive refractive index anisotropy), mainly a triacetylcellulose, a polycarbonate, or a polycycloolefins.

A retardation film composed of a polymer material having a negative intrinsic birefringence (a negative refractive index anisotropy) is also studied. Known examples of the polymer material having a negative intrinsic birefringence are a polystyrenic resin and a poly(methyl methacrylate)-series resin. Among these polymer materials, the poly(methyl methacrylate)-series resin hardly exhibits birefringence (or retardation or phase difference), and hardly obtains a desired retardation even if stretched. Thus, the polystyrenic resin is usually employed.

As a retardation film composed of such a polymer material, for example, Japanese Patent Application Laid-Open Publication Nos. 2003-043253 (JP 2003-043253 A, Patent Document 1), 2007-24940 (JP 2007-24940 A, Patent Document 2), and 2014-149508 (JP 2014-149508 A, Patent Document 3) disclose a laminated retardation film containing a film formed of a polymer material having a negative intrinsic birefringence.

Reference Examples 1 and 2 of Japanese Patent Application Laid-Open Publication No. 2013-64118 (JP 2013-64118 A, Patent Document 4), Example 3 of Japanese Patent Application Laid-Open Publication No. 2014-218645 (JP 2014-218645 A, Patent Document 5), Example 4 of Japanese Patent Application Laid-Open Publication No. 2015-218265 (JP 2015-218265 A, Patent Document 6), Reference Example 1 of Japanese Patent Application Laid-Open Publication No. 2016-69643 (JP 2016-69643 A, Patent Document 7), and Synthesis Example 1 of Japanese Patent Application Laid-Open Publication No. 2017-198956 (JP 2017-198956 A, Patent Document 8) specifically disclose preparation of a polyester resin containing 9,9-bis[4-(2-hydroxyethoxy)phenyl]fluorene (BPEF) and dimethyl ester (FDPM) or di-t-butyl ester (FDPT) of 9,9-bis(2-carboxyethyl)fluorene as polymerization components.

CITATION LIST

Patent Literature

Patent Document 1: JP 2003-043253 A
Patent Document 2: JP 2007-24940 A
Patent Document 3: JP 2014-149508 A
Patent Document 4: JP 2013-64118 A
Patent Document 5: JP 2014-218645 A
Patent Document 6: JP 2015-218265 A
Patent Document 7: JP 2016-69643 A
Patent Document 8: JP 2017-198956 A

SUMMARY OF INVENTION

Technical Problem

The polymer material having a negative intrinsic birefringence used in Examples of Patent Documents 1 to 3 has an insufficient heat resistance and tends to be fragile and easily crack. Thus, the polymer material has a low formability due to difficulty in processing such as film-forming or stretching. In addition, even if the polymer material can be formed into a film, the resulting film has a low handleability. In Examples of Patent Document 3, a multilayer film having a three-layer structure composed of a polystyrene layer that is fragile and hard to handle as a single layer and polycarbonate layers laminated on both sides of the polystyrene layer is formed by coextrusion, and the resulting multilayer film is stretched. In stretching the multilayer film, stretching conditions are limited due to differences in glass transition temperature or stretchability of each layer, and it is difficult to adjust the multilayer film to a desired retardation or thickness. This restricts the design freedom of a retardation film.

In recent years, thinner display devices have been awaited, and thinner retardation films also have been strongly awaited. Unfortunately, the retardation films obtained in Patent Documents 1 to 3 have limitations to thinning due to the laminated structures thereof. Further, the laminated films have a low productivity due to lamination step(s) required for the formation of the films.

Thus, desired are new retardation films satisfying these intended characteristics, specifically, a uniaxial film having a negative refractive index anisotropy such as a negative A-plate or a positive C-plate or a biaxial film having a negative refractive index anisotropy such as a positive B-plate.

In Patent Documents 4, 5, 7 and 8, the birefringence of stretched films formed of prepared polyester resins is measured. In particular, for Reference Example 1 of Patent Document 8, the resulting uniaxially stretched film has a front retardation (in-plane retardation) Re(550) of −188 nm at a wavelength of 550 nm (a value converted into a thickness of 50 μm) and an average thickness of 40 μm. Moreover, these Patent Documents describe retardation films as industrially applicable embodiments.

However, Patent Documents 4 to 8 fail to disclose that a thickness-direction retardation Rth shows a low or negative value.

It is therefore an object of the present invention to provide a retardation film having a high heat resistance, excellent formability and handleability in a single-layer structure, and a negative value of a thickness-direction retardation Rth, and to provide a method for producing the film.

Solution to Problem

The inventors of the present invention made intensive studies to achieve the above object and finally found the following: a stretched film of a specific polyester resin that has a fluorene-9,9-diyl skeleton having a negative intrinsic birefringence (or negative refractive index anisotropy) provides a retardation film having a negative value of a thickness-direction retardation Rth, and such a retardation film is suitably used as a negative A-plate, a positive C-plate, or a positive B-plate. The present invention was accomplished based on the above findings.

That is, the retardation film of the present invention includes a stretched film of a polyester resin containing a diol unit (A) and a dicarboxylic acid unit (B), the diol unit (A) contains a first diol unit (A1) having a fluorene skeleton represented by the following formula (1), the dicarboxylic acid unit (B) contains a dicarboxylic acid unit (B1) having a fluorene skeleton represented by the following formula (2a) or (2b), and the retardation film is a negative A-plate, a positive C-plate, or a positive B-plate:

[Chem. 1]

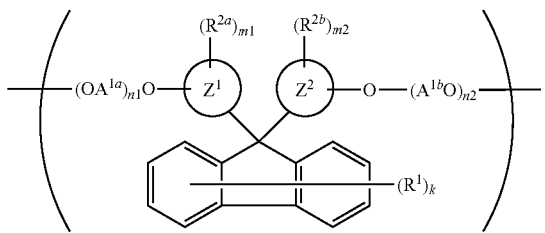

(1)

wherein $Z^1$ and $Z^2$ independently represent an aromatic hydrocarbon ring, $R^1$, $R^{2a}$ and $R^{2b}$ independently represent a substituent, k denotes an integer of 0 to 8, m1, m2, n1 and n2 independently denote an integer of not less than 0, and $A^{1a}$ and $A^{1b}$ independently represent a straight-chain or branched-chain alkylene group,

[Chem. 2]

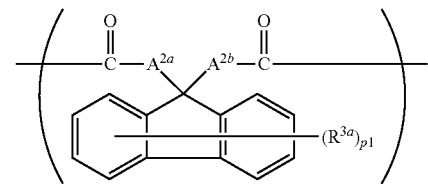

(2a)

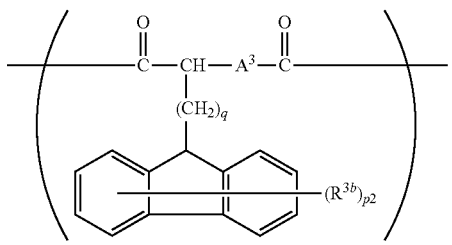

(2b)

wherein $R^{3a}$ and $R^{3b}$ independently represent a substituent, p1 and p2 independently denote an integer of 0 to 6, q denotes an integer of 0 to 4, and $A^{2a}$, $A^{2b}$ and $A^3$ independently represent a divalent hydrocarbon group which may have a substituent.

The diol unit (A) may further contain a second diol unit (A2) represented by the following formula (3). A ratio of the first diol unit (A1) relative to the second diol unit (A2) may be about 50/50 to 99/1 in terms of the former/the latter (molar ratio).

[Chem. 3]

(3)

In the formula (3), $A^4$ represents a straight-chain or branched-chain alkylene group, and r denotes an integer of not less than 1.

In the formula (1), $Z^1$ and $Z^2$ may be independently a benzene ring or a naphthalene ring, $R^{2a}$ and $R^{2b}$ may be independently an alkyl group or an aryl group, m1 and m2 may be independently an integer of about 0 to 2, $A^{1a}$ and $A^{1b}$ may be independently a $C_{2-4}$alkylene group, and n1 and n2 may be independently an integer of about 1 to 10, the dicarboxylic acid unit (B1) may contain at least a unit represented by the formula (2a), and in the formula (2a), $A^{2a}$ and $A^{2b}$ may be independently a straight-chain or branched-chain $C_{2-4}$alkylene group, a proportion of the first diol unit (A1) relative to the total diol units (A) may be about not less than 50% by mol, a proportion of the dicarboxylic acid unit (B1) relative to the total dicarboxylic acid units (B) may be about not less than 50% by mol, and a proportion of the total amount of the first diol unit (A1) and the dicarboxylic acid unit (B1) relative to the total constitutional units of the polyester resin may be about not less than 70% by mol.

The retardation film may be the negative A-plate, and the negative A-plate may be a λ/4 plate or a λ/2 plate. The retardation film may be the negative A-plate, and the negative A-plate may be
  a λ/4 plate having an in-plane retardation R0(550) of about 115 to 160 nm at a temperature of 20° C. and a wavelength of 550 nm, or
  a λ/2 plate having an in-plane retardation R0(550) of about 260 to 290 nm at a temperature of 20° C. and a wavelength of 550 nm.

The retardation film may be the positive C-plate, and the positive C-plate may have an in-plane retardation R0(550) of about 0 to 10 nm at a temperature of 20° C. and a wavelength of 550 nm.

The retardation film may be the positive B-plate, and the positive B-plate may have an in-plane retardation R0(550) of about 40 to 300 nm at a temperature of 20° C. and a wavelength of 550 nm. The retardation film may be any one selected from
  the positive B-plate being a λ/4 plate having an in-plane retardation R0(550) of 115 to 160 nm at a temperature of 20° C. and a wavelength of 550 nm,
  the positive B-plate being a λ/2 plate having an in-plane retardation. R0(550) of 260 to 290 nm at a temperature of 20° C. and a wavelength of 550 nm, and the positive B-plate having an in-plane
  retardation R0(550) of 40 to 75 nm at a temperature of 20° C. and a wavelength of 550 nm.

The retardation film may have a thickness-direction retardation Rth(550) of about −200 to −30 nm at a temperature of 20° C. and a wavelength of 550 nm. The retardation film may have an average thickness of about 5 to 150 μm.

The present invention includes a method for producing the retardation film, the method includes uniaxially or biaxially stretching an unstretched film (or a primary film) including the polyester resin under the following conditions:
  average thickness of the unstretched film: about 10 to 1000 μm, preferably about 30 to 200 μm stretching temperature: about (Tg−10) to (Tg+20) ° C., preferably about Tg to (Tg+15) ° C., wherein Tg represents a glass transition temperature of the polyester resin stretching speed: about 0.1 to 1000 mm/min., preferably about 10 to 500 mm/min.

stretching ratio: about 1.1 to 10 in uniaxial stretching or about 1.1 to 10 in each direction in biaxial stretching; preferably about 2 to 5 in uniaxial stretching or about 1.5 to 3 in each direction in biaxial stretching.

In the method, the biaxial stretching may be carried out under the same stretching ratio in each direction. In the method, the uniaxial stretching may be a fixed-end uniaxial stretching.

As used in this description and claims, the term "diol unit" or "constitutional unit derived from a diol component" means a unit (or divalent group) formed by removing two hydrogen atoms from two hydroxyl groups of the corresponding diol component. The term "diol component" (including a compound as exemplified as a diol component) may be used synonymously with the corresponding "diol unit". In the same way, the term "dicarboxylic acid unit" or "constitutional unit derived from a dicarboxylic acid component" means a unit (or divalent group) formed by removing two OH groups (hydroxyl groups) from two carboxyl groups of the corresponding dicarboxylic acid. The term "dicarboxylic acid component" (including a compound as exemplified as a dicarboxylic acid component) may be used synonymously with the corresponding "dicarboxylic acid unit".

As used in this description and claims, it is meant that the term "dicarboxylic acid component" includes a dicarboxylic acid, and in addition, an ester-forming derivative thereof, for example, a lower alkyl ester of a dicarboxylic acid, a dicarboxylic acid halide, and a dicarboxylic acid anhydride. The lower alkyl ester of the dicarboxylic acid may include, for example, a $C_{1-4}$alkyl ester such as methyl ester, ethyl ester, or t-butyl ester. The "ester-forming derivative" may be a monoester (half ester) or a diester.

As used in this description and claims, the term "positive intrinsic birefringence" means a characteristic showing, in a film plane of an oriented film (or stretched film) of a polymer, a refractive index in the orientation direction (or stretching direction) larger than a refractive index in a direction perpendicular to the orientation direction. The term "negative intrinsic birefringence" means a characteristic showing a refractive index in the orientation direction smaller than a refractive index in a direction perpendicular to the orientation direction.

As used in this description and claims, the number of carbon atoms in a substituent may be represented as, e.g., $C_1$, $C_6$, $C_{10}$. For example, an alkyl group having one carbon atom is represented as "$C_1$alkyl", and an aryl group having 6 to 10 carbon atoms is represented as "$C_{6-10}$aryl".

Advantageous Effects of Invention

The retardation film of the present invention is formed of the stretched film of the specific polyester resin having a fluorene-9,9-diyl skeleton having a negative intrinsic birefringence (or negative refractive index anisotropy), and the retardation film has a high heat resistance, excellent formability and handleability (or mechanical strength such as softness or toughness) in a single-layer structure, and a negative value of a thickness-direction retardation Rth. This allows suitable use as a negative A-plate, a positive C-plate, or a positive B-plate. Moreover, although the polyester resin contains many rigid fluorene-9,9-diyl skeletons, the polyester resin can unexpectedly be formed into a thin film. In particular, the polyester resin can be formed into a thin film without film breakage even if the polyester resin is subjected to biaxial stretching that has difficulty in stably forming a film due to easier film breakage compared with uniaxial stretching. Further, a negative A-plate, a positive C-plate, or a positive B-plate, each having a desired phase difference (or retardation), can be prepared even if the retardation film is formed into a thin film.

DESCRIPTION OF EMBODIMENTS

The retardation film of the present invention is formed of a stretched film of a specific polyester resin that has a fluorene-9,9-diyl skeleton (which may simply be referred to as a fluorene skeleton) having a negative intrinsic birefringence (or negative refractive index anisotropy). More specifically, the retardation film includes a uniaxial film such as a negative A-plate or a positive C-plate and a biaxial film such as a positive B-plate.

[Polyester Resin]

The polyester resin contains a diol unit (or a constitutional unit derived from a diol component) (A) and a dicarboxylic acid unit (or a constitutional unit derived from a dicarboxylic acid component) (B). The diol unit (A) and the dicarboxylic acid unit (B) each contain a specific unit having a fluorene-9,9-diyl skeleton.

(Diol Unit (A))

The diol unit (A) contains a first diol unit (or a constitutional unit derived from a first diol component) (A1) having a fluorene skeleton represented by the following formula (1):

[Chem. 4]

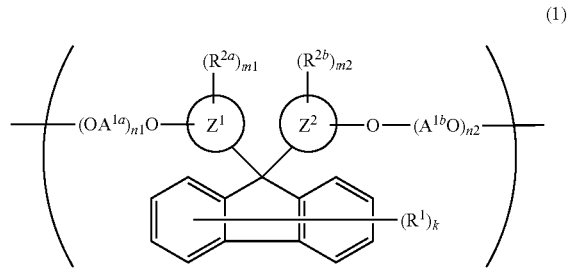

(1)

wherein $Z^1$ and $Z^2$ independently represent an aromatic hydrocarbon ring, $R^1$, $R^{2a}$ and $R^{2b}$ independently represent a substituent, k denotes an integer of 0 to 6, m1, m2, n1 and n2 independently denote an integer of not less than 0, and A1a and A1b independently represent a straight-chain or branched-chain alkylene group.

In the formula (1), the arene ring (aromatic hydrocarbon ring) represented by $Z^1$ and $Z^2$ may include, for example, a monocyclic arene ring such as a benzene ring, and a polycyclic arene ring. Examples of the polycyclic arene ring may include a condensed polycyclic arene ring (a condensed polycyclic aromatic hydrocarbon ring) and a ring-aggregated arene ring (a ring-aggregated aromatic hydrocarbon ring).

The condensed polycyclic arene ring may include, for example, a condensed bi- to tetra-cyclic arene ring such as a condensed bicyclic arene ring or a condensed tricyclic arene ring. Examples of the condensed bicyclic arene ring may include a condensed bicyclic $C_{10-16}$arene ring such as a naphthalene ring or an indene ring. The condensed tricyclic arene ring may include, for example, an anthracene ring and a phenanthrene ring. A preferred condensed polycyclic arene ring includes a condensed polycyclic $C_{10-16}$arene ring such as a naphthalene ring or an anthracene ring, a more preferred one includes a condensed polycyclic $C_{10-14}$arene ring. In particular, a naphthalene ring is preferred.

The ring-aggregated arene ring may include, for example, a biarene ring and a terarene ring. Examples of the biarene ring may include a bi$C_{6-12}$arene ring such as a biphenyl ring, a binaphthyl ring, or a phenylnaphthalene ring. The phenylnaphthalene ring may include, for example, 1-phenylnaphthalene ring and 2-phenylnaphthalene ring. Examples of the terarene ring may include a ter$C_{6-12}$arene ring such as a terphenylene ring. A preferred ring-aggregated arene ring includes a bi$C_{6-10}$arene ring. In particular, a biphenyl ring is preferred.

The species of the rings $Z^1$ and $Z^2$ may be the same or different from each other, and is practically the same. Among the rings $Z^1$ and $Z^2$, a $C_{6-12}$arene ring such as a benzene ring, a naphthalene ring, or a biphenyl ring is preferred, and a $C_{6-10}$arene ring such as a benzene ring or a naphthalene ring is more preferred. In particular, a benzene ring is preferred from the viewpoint of, for example, a high formability, a high heat resistance, and an easily obtainable desired retardation of the retardation film.

The substitution positions of the rings $Z^1$ and $Z^2$ bonded at 9-position of the fluorene ring are not particularly limited to specific positions. For example, in a case where the rings $Z^1$ and $Z^2$ is a benzene ring, the substitution positions may be any position of 1- to 6-positions; in a case where the rings $Z^1$ and $Z^2$ is a naphthalene ring, the substitution positions are any position of 1-position or 2-position, preferably 2-position; in a case where the rings $Z^1$ and $Z^2$ is a biphenyl ring, the substitution positions are any position of 2-position, 3-position, or 4-position, preferably 3-position.

The group $R^1$ may include a non-reactive substituent (or a substituent inactive to polymerization reaction), for example, a cyano group; a halogen atom such as fluorine atom, chlorine atom, or bromine atom; and a hydrocarbon group such as an alkyl group or an aryl group. Examples of the aryl group may include a $C_{6-10}$aryl group such as phenyl group. In a case where the number k of non-reactive substituents is not less than 1, the non-reactive substituent(s) is practically the cyano group, the halogen atom or the alkyl group, particularly the alkyl group. The alkyl group may include, for example, a $C_{1-12}$alkyl group methyl group, ethyl group, n-propyl group, isopropyl group, n-butyl group, or t-butyl group, preferably a $C_{1-8}$alkyl group, and more preferably a $C_{1-4}$alkyl group such as methyl group.

The number k of substituents is, for example, 0 to 4, preferably 0 to 2, more preferably 0 or 1, and particularly 0. The number of substituents on one of two benzene rings constituting the fluorene ring may be different from that of substituents on the other of two benzene rings, and these numbers are practically the same.

In a case where one of two benzene rings constituting the fluorene ring has two or more groups $R^1$, the species of the groups $R^1$ may be the same or different from each other. In a case where each benzene ring constituting the fluorene ring has one or more groups $R^1$, the species of the groups $R^1$ may be the same or different from each other. The bonding position(s) (substitution position(s)) of the group(s) $R^1$ with respect to two benzene rings constituting the fluorene ring is not particularly limited to a specific one, and may include, for example, 2-position, 7-position, and 2,7-positions of the fluorene ring.

The substituent represented by $R^{2a}$ and $R^{2b}$ may include, for example, a halogen atom such as fluorine atom, chlorine atom, bromine atom, or iodine atom; a hydrocarbon group (or group R) such as an alkyl group, a cycloalkyl group, an aryl group, or an aralkyl group; a group —OR corresponding to the hydrocarbon group (wherein R represents the above-mentioned hydrocarbon group), such as an alkoxy group, a cycloalkyloxy group, an aryloxy group, or an aralkyloxy group; a group —SR corresponding to the hydrocarbon group (wherein R represents the above-mentioned hydrocarbon group), such as an alkylthio group, a cycloalkylthio group, an arylthio group, or an aralkylthio group; an acyl group; a nitro group; a cyano group; and a substituted amino group.

The alkyl group represented by R may include, for example, a straight-chain or branched-chain $C_{1-10}$alkyl group such as methyl group, ethyl group, n-propyl group, isopropyl group, n-butyl group, s-butyl group, isobutyl group, or t-butyl group, preferably a straight-chain or branched-chain $C_{1-6}$alkyl group, and more preferably a straight-chain or branched-chain $C_{1-4}$alkyl group.

Examples of the cycloalkyl group represented by R may include a $C_{5-10}$cycloalkyl group such as cyclopentyl group or cyclohexyl group.

The aryl group represented by R may include, for example, a $C_{6-12}$aryl group such as phenyl group, an alkylphenyl group, biphenylyl group, or naphthyl group. Examples of the alkylphenyl group may include methylphenyl group (tolyl group) and dimethylphenyl group (xylyl group).

The aralkyl group represented by R may include, for example, a $C_{6-10}$aryl-$C_{1-4}$alkyl group such as benzyl group or phenethyl group.

The group —OR may include a group corresponding to the above-exemplified hydrocarbon group R, including preferred embodiments, for example, a straight-chain or branched-chain $C_{1-10}$alkoxy group such as methoxyl group, a $C_{5-10}$cycloalkyloxy group such as cyclohexyloxy group, a $C_{6-10}$aryloxy group such as phenoxy group, and a $C_{6-10}$aryl-$C_{1-4}$alkyloxy group such as benzyloxy group.

The group —SR may include a group corresponding to the above-exemplified hydrocarbon group R, including preferred embodiments, for example, a straight-chain or branched-chain $C_{1-10}$alkylthio group such as methylthio group, a $C_{5-10}$cycloalkylthio group such as cyclohexylthio group, a $C_{6-10}$arylthio group such as thiophenoxy group (phenylthio group), and a $C_{6-10}$aryl-$C_{1-4}$alkylthio group such as benzylthio group.

Examples of the acyl group may include a $C_{1-6}$acyl group such as acetyl group.

The substituted amino group may include, for example, a dialkylamino group and a bis(alkylcarbonyl)amino group. Examples of the dialkylamino group may include a di$C_{1-4}$alkylamino group such as dimethylamino group. Examples of the bis(alkylcarbonyl)amino group may include a bis($C_{1-4}$alkyl-carbonyl)amino group such as diacetylamino group.

Representative examples of these groups $R^{2a}$ and $R^{2b}$ may include the halogen atom, the hydrocarbon group (the alkyl group, the cycloalkyl group, the aryl group, the aralkyl group), the alkoxy group, the acyl group, the nitro group, the cyano group, and the substituted amino group. In a case where the numbers of m1 and m2 of substituents are not less than 1, the groups $R^{2a}$ and $R^{2b}$ preferably include the alkyl group, the cycloalkyl group, the aryl group, and the alkoxy group, more preferably a straight-chain or branched-chain $C_{1-6}$alkyl group such as methyl group, a $C_{5-8}$cycloalkyl group such as cyclohexyl group, a $C_{6-14}$aryl group such as phenyl group, and a straight-chain or branched-chain $C_{1-4}$alkoxy group such as methoxyl group. Among them, the alkyl group and the aryl group are preferred, particularly a straight-chain or branched-chain $C_{1-4}$alkyl group such as methyl group and a $C_{6-10}$aryl group such as phenyl group are preferred. In a case where the group $R^{2a}$ is the aryl group, the group $R^{2a}$ may form the ring-aggregated arene ring together with the ring $Z^1$. In a case where the group $R^{2b}$ is the aryl group, the group $R^{2b}$ may form the ring-aggregated arene ring together with the ring $Z^2$.

The numbers m1 and m2 of the substituents $R^{2a}$ and $R^{2b}$ are independently an integer of not less than 0 and may suitably be selected according to the species of the rings $Z^1$ and $Z^2$. The numbers may be, for example, an integer of about 0 to 8. A preferred range is an integer of 0 to 4, an integer of 0 to 3, and an integer of 0 to 2 in a stepwise manner. More preferred is 0 or 1, particularly 0. The number m1 of substituents may be different from the number m2 of substituents and is practically the same as the number m2. In a case where the number m1 of substituents is 2 or more, the species of the two or more groups $R^{2a}$ may be the same or different from each other. In a case where the number m2 of substituents is 2 or more, the species of the two or more groups $R^{2b}$ may be the same or different from each other. The species of the groups $R^{2a}$ and $R^{2b}$ may be the same or different from each other. In particular, in a case where m1 and m2 is 1, $Z^1$ and $Z^2$ may be a benzene ring, a naphthalene ring, or a biphenyl ring, and $R^{2a}$ and $R^{2b}$ may be a methyl group. The substitution positions of $R^{2a}$ and $R^{2b}$ are not particularly limited and are other than positions at which the rings $Z^1$ and $Z^2$ are bonded to ether bonds (—O—) and 9-position of the fluorene ring.

The alkylene groups $A^{1a}$ and $A^{1b}$ may include, for example, a straight-chain or branched-chain $C_{2-6}$alkylene group such as ethylene group, propylene group (1,2-propanediyl group), trimethylene group, 1,2-butanediyl group, or tetramethylene group. In a case where n1 and n2 are not less than 1, the alkylene group includes preferably a straight-chain or branched-chain $C_{2-4}$alkylene group, more preferably a straight-chain or branched-chain $C_{2-3}$alkylene group such as ethylene group or propylene group, and particularly preferably ethylene group.

The repeating numbers (added mole numbers) n1 and n2 of oxyalkylene groups ($OA^{1a}$) and ($OA^{1b}$) are independently an integer of not less than 0 and may be selected from a range of about 0 to 15. A preferred range is an integer of 0 to 10, an integer of 0 to 8, an integer of 0 to 6, an integer of 0 to 4, an integer of 0 to 2, and an integer of 0 to 1 in a stepwise manner. The repeating numbers n1 and n2 are practically not less than 1, for example, may be selected from a range of about 1 to 15. A preferred range is an integer of 1 to 10, an integer of 1 to 8, an integer of 1 to 6, art integer of 1 to 4, an integer of 1 to 3, and an integer of 1 to 2 in a stepwise manner. In particular, preferred is 1. As used in this description and claims, each of the terms "repeating number (added mole number) n1" and "repeating number (added mole number) n2" may be an average (arithmetic average, arithmetical average) or an average number of moles added, and a preferred embodiment thereof may be the same as that of the integer range. An excessively large repeating number n1 and/or n2 may lead to decrease in refractive index or failure of a desired retardation. The repeating numbers n1 and n2 may be the same or different from each other. In a case where n1 is 2 or more, the species of the two or more oxyalkylene groups ($OA^{1a}$) may be the same or different from each other. In a case where n2 is 2 or more, the species of the two or more oxyalkylene groups ($OA^{1b}$) may be the same or different from each other. The species of the oxyalkylene groups ($OA^{1a}$) and ($OA^{1b}$) may be the same or different from each other.

The substitution positions of the group [—O-$(A^{1a}O)_{n1}$—] and the group [—O-$(A^{1b}O)_{n2}$—] on the rings $Z^1$ and $Z^2$ are each suitable positions of the rings $Z^1$ and $Z^2$ without particular limitation. In a case where the rings $Z^1$ and $Z^2$ are a benzene ring, the substitution position of each of the group [—O-$(A^{1a}O)_{n1}$-] and the group [—O-$(A_{1b}O)_{n2}$—] on the corresponding one of the rings $Z^1$ and $Z^2$ is practically any of 2-position, 3-position, or 4-position of the phenyl group bonded to 9-position of the fluorene ring, especially either 3-position or 4-position, and particularly 4-position. In a case where the rings $Z^1$ and $Z^2$ are a naphthalene ring, the substitution position is practically any of 5- to 8-positions of the naphthyl group bonded to 9-position of the fluorene ring. For example, each of the group [—O-$(A^{1a}O)_{n1}$-] and the group [—O-$(A^{1b}O)_{n2}$—], and 9-position of the fluorene ring are practically bonded to the naphthalene ring at a relationship of 1,5-position, 2,6-position, particularly 2,6-position, where 1-position or 2-position of the naphthalene ring is bonded to 9-position of the fluorene ring (the fluorene ring has 1-naphthyl or 2-naphthyl substituent). In a case where the rings $Z^1$ and $Z^2$ are a ring-aggregated arene ring, the ring-aggregated arene ring may be substituted by the group [—O-$(A^{1a}O)_{n1}$-] or the group [—O-$(A^{1b}O)_{n2}$-] without particular limitation of substitution position, for example, an arene ring bonded to 9-position of the fluorene or an arene ring adjacent to the arene ring may be substituted by such a group. For example, in a case where the rings $Z^1$ and Z2 are a biphenyl ring (or the rings $Z^1$ and $Z^2$ are a benzene ring, m1 and m2 are 1, and $R^{2a}$ and Rb are a phenyl group), 3-position or 4-position of the biphenyl ring may be bonded to 9-position of the fluorene. In a case where 3-position of the biphenyl ring is bonded to 9-position of the fluorene, the substitution position of each of the group [—O-$(A^{1a}O)_{n1}$-] and the group [—O-$(A^{1b}O)_{n2}$-] may be, for example, any of 2-position, 4-position, 5-position, 6-position, 2'-position, 3'-position, or 4'-position of the biphenyl ring, and is practically preferably any of 6-position or 4'-position, particularly 6-position. In a case where 4-position of the biphenyl ring is bonded to 9-position of the fluorene, the substitution position of each of the group [—O-$(A^{1a}O)_{n1}$-] and the group [—O-$(A^{1b}O)_{n2}$-] may be, for example, any of 2-position, 3-position, 2'-position, 3'-position, or 4'-position of the biphenyl ring, and is practically preferably any of 2-position or 4'-position, particularly 2-position.

The first diol component (A1) corresponding to the constitutional unit represented by the formula (1) may include, for example, 9,9-bis(hydroxyaryl)fluorenes corresponding to the formula (1) wherein n1 and n2 is 0; and 9,9-bis[hydroxy(poly)alkoxyaryl]fluorenes corresponding to the formula (1) wherein n1 and n2 are not less than 1, for example, about 1 to 10. As used in this description and claims, the term "(poly)alkoxy" is used to mean both alkoxy group and polyalkoxy group unless otherwise noted.

The 9,9-bis(hydroxyaryl)fluorenes may include, for example, a 9,9-bis(hydroxyphenyl)fluorene, a 9,9-bis(alkyl-hydroxyphenyl) fluorene, a 9,9-bis(aryl-hydroxyphenyl) fluorene, and a 9,9-bis(hydroxynaphthyl)fluorene.

Examples of the 9,9-bis(hydroxyphenyl)fluorene may include 9,9-bis(4-hydroxyphenyl) fluorene.

The 9,9-bis(alkyl-hydroxyphenyl)fluorene may include, for example, a 9,9-bis(mono- or di-)$C_{1-4}$alkyl-hydroxyphenyl)fluorene such as 9,9-bis(4-hydroxy-3-methylphenyl) fluorene, 9,9-bis(4-hydroxy-3-isopropylphenyl)fluorene, or 9,9-bis(4-hydroxy-3,5-dimethylphenyl)fluorene.

Examples of the 9,9-bis(aryl-hydroxyphenyl)fluorene: may include a 9,9-bis($C_{6-10}$aryl-hydroxyphenyl)fluorene such as 9,9-bis(4-hydroxy-3-phenylphenyl)fluorene.

The 9,9-bis(hydroxynaphthyl)fluorene may include, for example, 9,9-bis(6-hydroxy-2-naphthyl)fluorene and 9,9-bis(5-hydroxy-1-naphthyl)fluorene.

Examples of the 9,9-bis[hydroxy(poly)alkoxyaryl]fluorenes may include a 9,9-bis[hydroxy(poly)alkoxyphenyl]fluorene, a 9,9-bis[alkyl-hydroxy(poly)alkoxyphenyl]fluorene, a 9,9-bis[aryl-hydroxy(poly)alkoxyphenyl]fluorene, and a 9,9-bis[hydroxy(poly)alkoxynaphthyl]fluorene.

The 9,9-bis[hydroxy(poly)alkoxyphenyl]fluorene may include, for example, a 9,9-bis[hydroxy(mono- to deca-)$C_{2-4}$alkoxy-phenyl]fluorene such as 9,9-bis[4-(2-hydroxyethoxy)phenyl]fluorene or 9,9-bis[4-(2-(2-hydroxyethoxy)ethoxy)phenyl]fluorene.

Examples of the 9,9-bis[alkyl-hydroxy(poly)alkoxyphenyl]fluorene may include a 9,9-bis[(mono- or di-)$C_{1-4}$alkyl-hydroxy(mono- to deca-)$C_{2-4}$alkoxy-phenyl]fluorene such as 9,9-bis[4-(2-hydroxyethoxy)-3-methylphenyl]fluorene, 9,9-bis[4-(2-(2-hydroxyethoxy)ethoxy)-3-isopropylphenyl]fluorene, 9,9-bis[4-(2-hydroxyethoxy)-3,5-dimethylphenyl]fluorene, or 9,9-bis[4-(2-hydroxypropoxy)-3,5-dimethylphenyl]fluorene.

The 9,9-bis[aryl-hydroxy(poly)alkoxyphenyl]fluorene may include, for example, a 9,9-bis[$C_{6-10}$aryl-hydroxy(mono- to deca-)$C_{2-4}$alkoxy-phenyl]fluorene such as 9,9-bis(4-(2-hydroxyethoxy)-3-phenylphenyl)fluorene.

Examples of the 9,9-bis[hydroxy(poly)alkoxynaphthyl]fluorene may include a 9,9-bis[hydroxy(mono- to deca-)$C_{2-4}$alkoxy-naphthyl]fluorene such as 9,9-bis[6-(2-hydroxyethoxy)-2-naphthyl]fluorene, 9,9-bis[5-(2-hydroxyethoxy)-1-naphthyl]fluorene, or 9,9-bis[6-(2-(2-hydroxyethoxy)ethoxy)-2-naphthyl]fluorene.

The first diol unit (A1) represented by the formula (1) may contain the constitutional units corresponding to these first diol components (A1) alone or in combination. The first diol unit (A1) preferably contains a constitutional unit derived from preferably 9,9-bis[hydroxy(poly)alkoxyaryl]fluorenes such as a 9,9-bis[hydroxy(mono- to deca-)$C_{2-4}$alkoxy$C_{6-10}$aryl]fluorene, more preferably a 9,9-bis[hydroxy (mono- to penta-)$C_{2-4}$alkoxy-phenyl]fluorene, more preferably a 9,9-bis[hydroxy(mono- or di-)$C_{2-3}$alkoxy-phenyl]fluorene, especially a 9,9-bis[hydroxy$C_{2-3}$alkoxy-phenyl]fluorene such as 9,9-bis[4-(2-hydroxyethoxy)phenyl]fluorene.

The diol unit (A) may further contain a second diol unit (or a constitutional unit derived from a second diol component) (A2) represented by the following formula (3) for the purpose of increasing the polymerization reactivity, imparting the softness (or flexibility) to the polyester resin to improve the toughness or other characteristics, and improving the formability or handleability.

[Chem. 5]

(3)

In the formula, $A^4$ represents a straight-chain or branched-chain alkylene group, and r denotes an integer of not less than 1.

In the formula (3), the alkylene group represented by $A^4$ may include, for example, a straight-chain or branched-chain $C_{2-12}$alkylene group such as ethylene group, propylene group, trimethylene group, 1,2-butanediyl group, 1,3-butanediyl group, tetramethylene group, 1,5-pentanediyl group, 1,6-hexanediyl group, 1,8-octanediyl group, or 1,10-decanediyl group. A preferred alkylene group $A^4$ includes a straight-chain or branched-chain $C_{2-10}$alkylene group, a straight-chain or branched-chain $C_{2-6}$alkylene group, a straight-chain or branched-chain $C_{2-6}$alkylene group, and a straight-chain or branched-chain $C_{2-4}$alkylene group, more preferably a straight-chain or branched-chain $C_{2-3}$alkylene group such as ethylene group or propylene group, and particularly preferably ethylene group in a stepwise manner.

The number r is not less than 1, for example, may be selected from a range of about 1 to 10. A preferred range is an integer of 1 to 8, an integer of 1 to 6, an integer of 1 to 4, an integer of 1 to 3, and an integer of 1 to 2 in a stepwise manner. Particularly preferred is 1. The repeating number r may be an average (arithmetic average or arithmetical average), and a preferred embodiment thereof may be the same as that of the integer range. In a case where r is 2 or more, the species of the two or more oxyalkylene groups (-$A^4$O—) may be the same or different from each other.

The second diol component (A2) for forming the second diol unit (A2) represented by the formula (3) may include, for example, an alkanediol (or alkylene glycol) and a polyalkanediol (or polyalkylene glycol).

Examples of the alkylene glycol may include a compound corresponding to the formula (3) in which r is 1 and $A^4$ is the above-exemplified alkylene group. Specifically, such a compound may include a straight-chain or branched-chain $C_{2-12}$alkylene glycol such as ethylene glycol, propylene glycol, trimethylene glycol, 1,2-butanediol, 1,3-butanediol, tetramethylene glycol (1,4-butanediol), 1,5-pentanediol, neopentyl glycol, 1,6-hexanediol, 1,8-octanediol, or 1,10-decanediol. A preferred embodiment corresponds to that of the alkylene group $A^4$.

Examples of the polyalkylene glycol may include a compound corresponding to the formula (3) in which r is not less than 2, for example, r is about 2 to 10, and $A^4$ is the above-exemplified alkylene group. Specifically, such a compound may include a di- to deca-straight-chain or branched-chain $C_{2-12}$alkylene glycol such as diethylene glycol, dipropylene glycol, or triethylene glycol, preferably a di- to hexa-straight-chain or branched-chain $C_{2-6}$alkylene glycol, and more preferably a di- to tetra-straight-chain or branched-chain $C_{2-4}$alkylene glycol.

The second diol units (A2) formed from these second diol components (A2) may be used alone or in combination. A preferred second diol unit (A2) contains a constitutional unit derived from a straight-chain or branched-chain $C_{2-6}$alkylene glycol, more preferably a straight-chain or branched-chain $C_{2-4}$alkylene glycol such as ethylene glycol, propylene glycol, or 1,4-butanediol, especially a straight-chain or branched-chain $C_{2-3}$alkylene glycol such as ethylene glycol or propylene glycol, particularly ethylene glycol.

The diol unit (A) may further contain a diol unit (a third diol unit or a constitutional unit derived from a third diol component) (A3) that is different from the first and second diol units, unless the effects of the present invention are damaged. The third diol unit is not necessarily needed. The third diol unit (A3) may include a constitutional unit derived from, for example, an alicyclic diol, an aromatic diol, and an alkylene oxide (or alkylene carbonate, haloalkanol) adduct of such a diol component.

Examples of the alicyclic diol may include a cycloalkanediol such as cyclohexanediol; a bis(hydroxyalkyl)cycloalkane such as cyclohexane dimethanol; and a hydrogenated product of the after-mentioned aromatic diol such as a hydrogenated product of bisphenol. A.

The aromatic diol may include, for example, a dihydroxyarene such as hydroquinone or resorcinol; an araliphatic diol such as benzene dimethanol; bisphenols such as bisphenol A, bisphenol F, bisphenol AD, bisphenol C, bisphenol G, or bisphenol S; and biphenols such as p,p'-biphenol.

The alkylene oxide (or corresponding alkylene carbonate, haloalkanol) adduct of such a diol component may include, for example, a $C_{2-4}$alkylene oxide adduct, preferably a $C_{2-3}$alkylene oxide. The added mole number is not particularly limited to a specific one. Specifically, such a adduct may include an adduct in which about 2 to 10 mol of ethylene oxide is added to 1 mol of bisphenol A.

The third diol units (A3) derived from these third diol component (A3) may be used alone or in combination.

The proportion of the first diol unit (A1) relative to the total diol units (A) may be, for example, not less than 1% by mol, specifically about 10 to 100% by mol. A preferred range is not less than 30% by mol, not less than 50% by mol, and not less than 60% by mol. more preferably 65 to 95% by mol, further preferably 70 to 90% by mol, especially 75 to 85% by mol, and particularly 77 to 83% by mol in a stepwise manner.

The proportion of the total amount of the first diol unit (A1) and the second diol unit (A2) relative to the total diol units (A) may be, for example, about not more than 1% by mol. A preferred range is not less than 30% by mol, not less than 50% by mol, not less than 70% by mol, not less than 80% by mol, not less than 90% by mol, and not less than 95% by mol in a stepwise manner. In particular, it is preferred that the proportion be substantially 100% by mol, that is, the diol unit (A) only contain the first diol unit (A1) and the second diol unit (A2).

In a case where the second diol unit (A2) is contained, the ratio of the first diol unit (A1) relative to the second diol unit (A2) may be about 1/99 to 99.9/0.1 in terms of the former/the latter (molar ratio). A preferred range is 30/70 to 99.5/0.5, 50/50 to 99/1, 60/40 to 97/3, 65/35 to 95/5, more preferably 70/30 to 90/10, further preferably 72/28 to 88/12, especially 75/25 to 85/15, and particularly 77/23 to 83/17 in a stepwise manner. In a case where the ratio of the first diol unit (A1) is excessively low, the resulting film may fail to obtain a desired retardation. In a case where the ratio of the second diol unit (A2) is excessively low, the resulting polymer may have a low polymerization degree or weight-average molecular weight Mw and may also be low in a mechanical strength such as softness (or flexibility) or toughness.

(Dicarboxylic Acid Unit (B))

The dicarboxylic acid unit (B) contains a first dicarboxylic acid unit (or a constitutional unit derived from a first dicarboxylic acid component) (B1) having a fluorene skeleton represented by the following formula (2a) or (2b). Such a first dicarboxylic acid unit (B1) not only facilitates preparation of a retardation film having a negative intrinsic birefringence but also relatively easily maintains softness (or flexibility) or toughness in a polyester resin even having a rigid fluorene skeleton, thus preventing reduction in formability or handleability.

[Chem. 6]

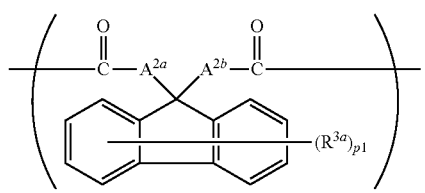

(2a)

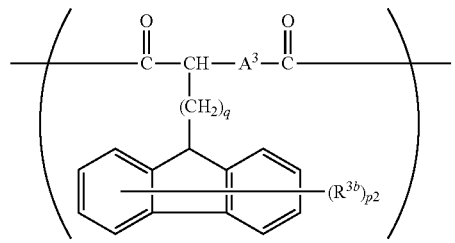

(2b)

In the formula, $R^{3a}$ and $R^{3b}$ independently represent a substituent, p1 and p2 independently denote an integer of 0 to 8, q denotes an integer of 0 to 4, and $A^{2a}$, $A^{2b}$ and $A^3$ independently represent a divalent hydrocarbon group which may have substituent (s).

In the formula (2a) or (2b), the substituent represented by $R^{3a}$ or $R^{3b}$ corresponds to the group R in the formula (1), and the substitution number p1 or p2 of $R^{3a}$ or $R^{3b}$ corresponds to the substitution number k of $R^1$ in the formula (1), which correspondences also include preferred embodiments of concrete examples, substitution position, and others.

The hydrocarbon group represented by the groups $A^{2a}$, $A^{2b}$ and $A^3$ may include a straight-chain or branched-chain alkylene group, for example, a straight-chain or branched-chain $C_{1-8}$alkylene group such as methylene group, ethylene group, trimethylene group, propylene group, 1,2-butanediyl group, or 2-methylpropane-1,3-diyl group. A preferred alkylene group includes a straight-chain or branched-chain $C_{1-6}$ alkylene group such as methylene group, ethylene group, trimethylene group, propylene group, or 2-methylpropane-1,3-diyl group. More preferred is a straight-chain or branched-chain $C_{1-4}$alkylene group.

The optional substituent of the hydrocarbon group may include, for example, an aryl group such as phenyl group, and a cycloalkyl group such as cyclohexyl group. The hydrocarbon group $A^{2a}$, $A^{2b}$ or $A^3$ having a substituent may be, for example, 1-phenylethylene group and 1-phenylpropane-1,2-diyl group.

The group $A^{2a}$ and $A^{2b}$ are practically a straight-chain or branched-chain $C_{2-4}$alkylene group, especially a straight-chain or branched-chain $C_{2-3}$alkylene group such as ethylene group or propylene group, and particularly ethylene group. The group $A^3$ is practically a straight-chain or branched-chain $C_{1-3}$alkylene group such as methylene group or ethylene group.

In the formula (2b), the repeating number q of methylene groups is, for example, an integer of about 0 to 3, preferably an integer of 0 to 2, and more preferably 0 or 1.

Concrete examples of the dicarboxylic acid component represented by the formula (2a) may include a compound in which $A^{2a}$ and $A^{2b}$ are a straight-chain or branched-chain $C_{2-6}$alkylene group, a 9,9-bis(carboxy$C_{2-6}$alkyl) fluorene such as 9,9-bis(2-carboxyethyl)fluorene or 9,9-bis(2-carboxypropyl)fluorene, and ester-forming derivatives of the compounds mentioned above.

Concrete examples of the dicarboxylic acid component represented by the formula (2b) may include a 9-(dicarboxy$C_{2-8}$alkyl)fluorene and an ester-forming derivative thereof, for example, a compound in which q is 0 and $A^3$ is a straight-chain or branched-chain $C_{1-6}$alkylene group, 9-(1,2-dicarboxyethyl) fluorene; and a compound in which q is 1 and $A^3$ is a straight-chain or branched-chain $C_{1-6}$alkylene group, 9-(2',3-dicarboxypropyl) fluorene.

The first dicarboxylic acid units (B1) derived from these first dicarboxylic acid components (B1) may be used alone or in combination. Among these first dicarboxylic acid units (B1), at least the dicarboxylic acid unit represented by the formula (2a) is preferably contained from the viewpoint of easy adjustment to a desired retardation, and a constitutional unit derived from 9,9-bis(carboxyalkyl)fluorenes such as 9,9-bis(carboxyC$_{2-6}$alkyl)fluorenes is more preferred. In particular, contained is a constitutional unit derived from, preferably 9,9-bis(carboxyC$_{2-4}$alkyl)fluorenes and ester-forming derivatives thereof, more preferably 9,9-bis(carboxyC$_{2-3}$alkyl)fluorenes such as 9,9-bis(2-carboxyethyl)fluorene and 9,9-bis(2-carboxypropyl)fluorene, and particularly 9,9-bis(2-carboxyethyl)fluorenes.

The dicarboxylic acid unit (B) may contain a second dicarboxylic acid unit (another dicarboxylic acid unit) (B2) that is different from the first dicarboxylic acid unit, unless the effects of the present invention are damaged. The second dicarboxylic acid unit is not necessarily needed. The second dicarboxylic acid unit (B2) may include a constitutional unit derived from, for example, an aromatic dicarboxylic acid component [provided that the first dicarboxylic acid component (B1) is excluded], an alicyclic dicarboxylic acid component, and an aliphatic dicarboxylic acid component, and ester-forming derivatives thereof.

Examples of the aromatic dicarboxylic acid component [provided that the first dicarboxylic acid component (B1) is excluded] may include a monocyclic aromatic dicarboxylic acid and a polycyclic aromatic dicarboxylic acid. The monocyclic aromatic dicarboxylic acid may include, for example, a benzenedicarboxylic acid such as phthalic acid, terephthalic acid, or isophthalic acid; and an alkylbenzenedicarboxylic acid, specifically a C$_{1-4}$alkyl-benzenedicarboxylic acid such as 4-methylisophthalic acid.

The polycyclic aromatic dicarboxylic acid may include, for example, a condensed polycyclic aromatic dicarboxylic acid, specifically a condensed polycyclic C$_{10-24}$arene-dicarboxylic acid such as a naphthalenedicarboxylic acid such as 1,2-naphthalenedicarboxylic acid, 1,5-naphthalenedicarboxylic acid, 1,8-naphthalenedicarboxylic acid, or 2,6-naphthalenedicarboxylic acid, an anthracenedicarboxylic acid, or a phenanthrenedicarboxylic acid, preferably a condensed polycyclic C$_{10-14}$arene-dicarboxylic acid; an arylarenedicarboxylic acid, specifically a C$_{6-10}$aryl-C$_{6-10}$arene-dicarboxylic acid such as 2,2'-biphenyldicarboxylic acid or 4,4'-biphenyldicarboxylic acid; a diarylalkanedicarboxylic acid, specifically a diC$_{6-10}$aryl$_{1-6}$alkane-dicarboxylic acid such as 4,4'-diphenylmethanedicarboxylic acid; and a diarylketonedicarboxylic acid, specifically a di(C$_{6-10}$aryl)ketone-dicarboxylic acid such as 4,4'-diphenylketonedicarboxylic acid.

The alicyclic dicarboxylic acid component may include, for example, a cycloalkanedicarboxylic acid, specifically a C$_{5-10}$cycloalkane-dicarboxylic acid such as 1,4-cyclohexanedicarboxylic acid; a bridged cyclic cycloalkanedicarboxylic acid, specifically, a di- or tri-cycloalkanedicarboxylic acid such as decalindicarboxylic acid, norbornanedicarboxylic acid, adamantanedicarboxylic acid, or tricyclodecanedicarboxylic acid; a cycloalkenedicarboxylic acid, specifically, a C$_{5-10}$cycloalkene-dicarboxylic acid such as cyclohexenedicarboxylic acid; and a bridged cyclic cycloalkenedicarboxylic acid, specifically, a di- or tri-cycloalkenedicarboxylic acid such as norbornenedicarboxylic acid.

The aliphatic dicarboxylic acid component may include, for example, an alkanedicarboxylic acid, specifically, a C$_{2-12}$alkane-dicarboxylic acid such as succinic acid, adipic acid, sebacic acid, or decanedicarboxylic acid; and an unsaturated aliphatic dicarboxylic acid, specifically, a C$_{2-10}$alkene-dicarboxylic acid such as maleic acid, fumaric acid, or itaconic acid.

The proportion of the first dicarboxylic acid unit (B1) relative to the total dicarboxylic acid units (B) may be selected from a range of, for example, not less than 1% by mol, specifically about 10 to 100% by mol. A preferred range is not less than 30% by mol, not less than 50% by mol, not less than 60% by mol, not less than 70% by mol, not less than 80% by mol, not less than 90% by mol, and not less than 95% by mol in a stepwise manner. In particular, it is preferred that the proportion be 100% by mol, that is, the dicarboxylic acid unit (B) substantially contain only the first dicarboxylic acid unit (B1). In a case where the proportion of the first dicarboxylic acid unit (B1) is excessively low, it may be difficult to obtain a retardation film having a negative intrinsic birefringence and to prepare a film having a desired retardation.

The proportion of the total amount of units each derived from a polymerization component having a fluorene-9,9-diyl skeleton, that is, the total amount of the first diol unit (A1) and the first dicarboxylic acid unit (B1), relative to the total constitutional units of the polyester resin may be selected from a range of, for example, not less than 10% by mol, specifically about 30 to 100% by mol. A preferred range is not less than 50% by mol, not less than 60% by mol, not less than 70% by mol, not less than 80% by mol, more preferably 82 to 98% by mol, especially 85 to 95% by mol, and particularly 87 to 93% by mol in a stepwise manner. In a case where the proportion of the unit having a fluorene-9,9-diyl skeleton is excessively low, the resulting polymer may have a low heat resistance and further may hardly be prepared into a retardation film having a negative intrinsic birefringence. In a case where a polymer has a high proportion of a constitutional unit having a rigid molecular skeleton, such as a constitutional unit having a fluorene-9,9-diyl skeleton, it is usually predicted that the polymer has a significantly low formability, making it difficult to form a film, in particular to form a thin film by stretching or other means. However, according to the present invention, the polyester resin has an unexpectedly high formability probably due to a specific constitutional unit contained in a specific proportion, and allows thin-film formation even subjected to biaxial stretching that has difficulty in film formation due to easier film breakage compared with uniaxial stretching.

(Production Method of Polyester Resin and Characteristics Thereof)

The polyester resin is produced by allowing the diol component (A) react with the dicarboxylic acid component (B) and can be prepared by a conventional method, for example, melt polymerization such as transesterification or direct polymerization, solution polymerization, and interfacial polymerization. Preferred is melt polymerization. The reaction may be carried out in the presence or absence of solvent(s) depending on the polymerization method.

The feed ratio (preparation ratio) of the dicarboxylic acid component (B) relative to the diol component (A) is practically, for example, 1/1.2 to 1/0.8, preferably 1/1.1 to 1/0.9, in terms of the former/the latter (molar ratio). For the reaction, the diol component (A) and/or the dicarboxylic acid component (B) may optionally be used in an excessive feed amount (feed ratio). For example, the second diol component (A2) such as ethylene glycol that can be removed from the reaction system may be used in excess of an amount (or ratio) to be introduced in the polyester resin.

The reaction may be carried out in the presence of catalyst(s). As the catalyst, a conventional esterification catalyst, for example, a metal catalyst, can be used. As the metal catalyst, there may be used a metal compound containing, for example, an alkali metal such as sodium; an alkaline earth metal such as magnesium, calcium, or barium; a transition metal such as titanium, manganese, or cobalt; a group 12 metal of the Periodic Table such as zinc or cadmium; a group 13 metal of the Periodic Table such as aluminum; a group 14 metal of the Periodic Table such as germanium or lead; and a group 15 metal of the Periodic Table such as antimony. The metal compound may be, for example, an alkoxide; an organic acid salt such as an acetate or a propionate; an inorganic acid salt such as a borate or a carbonate; and a metal oxide, or may be a hydrate thereof. Representative examples of the metal compound may include a germanium compound such as germanium dioxide, germanium hydroxide, germanium oxalate, germanium tetraethoxide, or germanium-n-butoxide; an antimony compound such as antimony trioxide, antimony acetate, or antimony ethylene glycolate; a titanium compound such as tetra-n-propyl titanate, tetraisopropyl titanate, tetra-n-butyl titanate, titanium oxalate, or titanium potassium oxalate; a manganese compound such as manganese acetate tetrahydrate; and a calcium compound such as calcium acetate monohydrate.

These catalysts may be used alone or in combination. In a case where a plurality of catalysts is used, each catalyst may be added according to the process of the reaction. Among these catalysts, manganese acetate tetrahydrate, calcium acetate monohydrate, germanium dioxide, and others are preferred. The amount of the catalyst is, for example, $0.01 \times 10^{-4}$ to $100 \times 10^{-4}$ mol, preferably $0.1 \times 10^{-4}$ to $40 \times 10^{-4}$ mol, relative to 1 mol of the dicarboxylic acid component (B).

The reaction may be carried out in the presence of a stabilizer such as a heat stabilizer or an antioxidant, if necessary. The heat stabilizer is practically used. Examples of the heat stabilizer may include a phosphorus compound such as trimethyl phosphate, triethyl phosphate, triphenyl phosphate, phosphorous acid, trimethyl phosphite, or triethyl phosphite. The amount of the heat stabilizer is, for example, $0.01 \times 10^{-4}$ to $100 \times 10^{-4}$ mol, preferably $0.1 \times 10^{-4}$ to $40 \times 10^{-4}$ mol, relative to 1 mol of the dicarboxylic acid component (B).

The reaction may practically be carried out in an atmosphere of an inert gas, for example, a nitrogen gas; and a rare gas such as helium or argon. The reaction may also be carried out under a reduced pressure, for example, about $1 \times 10^2$ to $1 \times 10^4$ Pa. The reaction temperature may be selected according to the polymerization method. For example, the reaction temperature for melt polymerization is 150 to 300° C., preferably 180 to 290° C., and more preferably 200 to 280° C.

The glass transition temperature Tg of thus obtained polyester resin may be selected from a range of, for example, about 100 to 200° C. A preferred range is 110 to 170° C., preferably 115 to 150° C., more preferably 120 to 140° C., and particularly 120 to 130° C. in a stepwise manner. In a case where the polyester resin has an excessively high glass transition temperature Tg, the polyester resin may have a low formability, which may make it difficult to produce a film by melt forming. In a case where the polyester resin has an excessively low glass transition temperature Tg, the polyester resin may have a low heat resistance, which may reduce a reliability under a moist heat environment after mounting in an image display device.

The weight-average molecular weight Mw of the polyester resin can be measured by gel permeation chromatography (GPC) or other means and may be selected from a range of, for example, about 10000 to 0.000000 in terms of polystyrene. A preferred range is 20000 to 100000, 25000 to 80000, preferably 30000 to 70000, 35000 to 60000, and 40000 to 50000 in a stepwise manner. The weight-average molecular weight Mw is practically 40000 to 90000, preferably 50000 to 80000, and more preferably 60000 to 70000. In a case where the weight-average molecular weight Mw is excessively low, the polyester resin may tend to have a low formability (film formability or stretchability), which may make it difficult to form a thin film by stretching and may induce film breakage.

As used in this description and claims, the glass transition temperature Tg and the weight-average molecular weight Mw can be measured according to the methods described in the after-mentioned Examples.

[Preparation Method of Retardation Film and Characteristics Thereof]

The retardation film of the present invention may be prepared through a film-forming step of forming the polyester resin into a film, and if necessary, a stretching step of stretching an unstretched film (or a primary film) obtained in the film-forming step.

In the film-forming step, the polyester resin may contain, for example, any other conventional thermoplastic resin, unless the effects of the present invention are damaged. The polyester resin is practically free from the conventional thermoplastic resin.

In the film-forming step, the polyester resin may contain various additives unless the effects of the present invention are damaged. Examples of such an additive may include a plasticizer such as an ester, a phthalic acid-series compound, an epoxy compound, or a sulfonamide; a flame retardant such as an inorganic flame retardant, an organic flame retardant, or a colloid flame retardant substance; a stabilizer such as an antioxidant, an ultraviolet absorbing agent, or a heat stabilizer; an antistatic agent; a filler such as an oxide-series inorganic filler, a non-oxide-series inorganic filler, or a metal powder; a foaming agent; a defoaming agent; a lubricant; a release agent such as a natural wax, a synthetic wax, a straight-chain fatty acid or a metal salt thereof, or an acid amide; a lubricating agent, specifically, an inorganic fine particle such as silica, titanium oxide, calcium carbonate, clay, mica, or kaolin, and an organic fine particle such as a (meth)acrylic resin or a (crosslinked) styrenic resin; and a compatibilizer. These additives may be used alone or in combination. These additives may be added by a conventional method, for example, a melt kneading method using a single-screw or twin-screw extruder.

The film forming method is not particularly limited to a specific one. For example, the film may be prepared by a casting method (a solution casting method), an extrusion method, a calendaring method, or other methods. The extrusion method may include a melt extrusion method such as an inflation method or a T-die method. The melt extrusion method such as the T-die method is preferred from the viewpoint of not only excellent formability but also prevention of lowering in optical characteristics due to a residual solvent.

The average thickness of the unstretched film obtained in the film-forming step may be selected from a range of, for example, about 10 to 1000 μm. A preferred range is 20 to 500 μm, 30 to 200 μm, 35 to 150 μm, 40 to 120 μm, and 45 to 110 μm in a stepwise manner. In particular, in a case where the unstretched film is subjected to fixed-end uniaxial stretching or biaxial stretching in the after-mentioned stretching step, the average thickness of the unstretched film is, for example, 50 to 170 μm, and a preferred range is 60 to 160 μm, 70 to 150 μm, 75 to 140 μm, and 80 to 135 μm in a stepwise manner. In a case where the unstretched film has an excessively large average thickness, the retardation film may be made thinner insufficiently. In a case where the unstretched film has an excessively small average thickness, the film may be broken in the stretching step or other steps. The average thickness can be measured according to the method described in the after-mentioned Examples.

The retardation film of the present invention is practically a stretched film obtained through the stretching step in light of easy adjustment to a desired retardation and easy formation of a thin film by stretching. The stretching treatment in the stretching step may be a stretching in which a stress is substantially applied to any one direction of a machine (or longitudinal) direction and a crosswise (or wide) direction, such as a free-end uniaxial stretching, or may be a stretching in which a stress is substantially applied to both machine direction and crosswise direction, such as a fixed-end uniaxial stretching or a biaxial stretching. The biaxial stretching may be a stretching at substantially the same (or equal) stretching ratio in each direction (such a stretching may be referred to as an equal stretching) or may be a stretching at a different stretching ratio in each direction (such a stretching may be referred to as a biased stretching).

The "free-end uniaxial stretching" is a uniaxial stretching without applying a stress to a direction perpendicular to a stretching direction (hereinafter the direction perpendicular to the stretching direction may simply be referred to as a crosswise direction) in a film plane. A free-end uniaxially stretched film practically contracts in the crosswise direction (what is called neck-in). The "fixed-end uniaxial stretching" is a uniaxial stretching which is conducted while maintaining or fixing a length of a crosswise direction constant with respect to a stretching direction in a film plane (or while preventing neck-in or contraction). In this fixed-end stretching, a stress is substantially applied in the crosswise direction.

Probably due to a stress substantially applied to both machine direction and crosswise direction, the fixed-end uniaxial stretching and the biaxial stretching tend to induce film breakage compared with the free-end uniaxial stretching in which a stress is applied to one direction, and to often have a difficulty in forming a resin having a rigid skeleton into a film. However, according to the present invention, even in a case where the polyester resin contains a large amount of a rigid fluorene-9,9-diyl skeleton, such a polyester resin unexpectedly has a high formability and can be fixed-end uniaxially stretched or biaxially stretched. Thus, it is preferred that the polyester resin be subjected to a stretching in which a stress is substantially applied to both machine direction and crosswise direction.

Depending on the stretching conditions such as the stretching temperature, the stretching ratio, and the stretching speed, practically, a negative A-plate can be prepared in the free-end uniaxial stretching; a positive C-plate can be prepared in the biaxial stretching at which stretching ratios in longitudinal and transverse directions are equal (an equal stretching); and a positive B-plate can be prepared in the fixed-end uniaxial stretching or the biaxial stretching at which stretching ratios in longitudinal and transverse directions are different (a biased stretching). The negative A-plate is a retardation film that satisfies a relational expression represented by the following formula (4), the positive C-plate is a retardation film that satisfies a relational expression represented by the following formula (5), and the positive B-plate is a retardation film that satisfies a relational expression represented by the following formula (6):

$$nz=nx>ny \quad (4)$$

$$nz>nx=ny \quad (5)$$

$$nz>nx>ny \quad (6)$$

wherein nx represents a refractive index in a slow axis direction in a film plane of a retardation film, ny represents a refractive index in a fast axis direction in a film plane of a retardation film, and nz represents a refractive index in a thickness direction of a retardation film.

As used in this description and claims, the "slow axis direction" means a direction in which a refractive index in a film plane of a retardation film is maximum, and the "fast axis direction" means, in a film plane of a retardation film, a direction perpendicular to the slow axis direction.

As used in this description and claims, the "=" in the formulae (4) and (5) means to include that each of nz and nx in the formula (4) or each of nx and ny in the formula (5) is not only exactly the same but also substantially the same (or in a practically acceptable range). Thus, for the formula (4), when (nz−nx)×d (wherein d represents an average thickness of a retardation film) is −10 to 10 nm, nz and nx are expressed as "nz=rnx"; for the formula (5), when (nx−ny)×d (wherein d represents an average thickness of a retardation film) is 0 to 10 nm, nx and ny are expressed as "nx=ny".

As used in this description and claims, a film in which two refractive indexes selected from nx, ny and nz are substantially the same (or have a relation expressed by the above-mentioned "=") is referred to as a "uniaxial film", and such a film may include, for example, a negative A-plate that satisfies the relational expression represented by the formula (4), and a positive C-plate that satisfies the relational expression represented by the formula (5). On the other hand, a film in which nx, ny and nz are not substantially the same from one another (or do not have a relation expressed by the above-mentioned "=") is referred to as a "biaxial film", and such a film may include, for example, a positive B-plate that satisfies the relational expression represented by the formula (6).

(Stretching Condition for Preparing Negative A-Plate)

The negative A-plate can practically be produced by the free-end uniaxial stretching. In the free-end uniaxial stretching, the stretching direction may be either a longitudinal stretching in which an unstretched film (or a primary film) is stretched in a machine (or longitudinal) direction thereof or a transverse stretching in which an unstretched film (or a primary film) is stretched in a crosswise (or wide) direction thereof. The stretching method is not particularly limited to a specific one and may be a conventional method such as an inter-roll stretching method, a hot-roll stretching method, a compression stretching method, or a tenter stretching method. The stretching method may be a wet stretching method. In light of the relationship with the following stretching temperature, the stretching method is practically a dry stretching method.

The stretching temperature for the free-end uniaxial stretching with respect to the glass transition temperature Tg of the polyester resin (the same shall apply hereinafter) is, for example, (Tg−10) to (Tg+20) ° C., and is preferably in a stepwise manner (Tg−5) to (Tg+10) ° C., (Tg−3) to (Tg+5) ° C., (Tg+2) to (Tg+5) ° C., practically Tg to (Tg+15) ° C., and more preferably (Tg+3) to (Tg+12) ° C.

A specific temperature is, for example, 100 to 150° C., and is preferably in a stepwise manner 110 to 145° C., 120 to 140° C., 129 to 133° C., practically 125 to 140° C., and preferably 128 to 137° C.

From the viewpoint of easy preparation of a negative A-plate being a λ/2 plate (a λ/2 plate that has a negative Rth value, a −λ/2 plate, or a −1/2 wave plate), the stretching temperature is, for example, Tg to (Tg+10) ° C., preferably (Tg+2) to (Tg+8) ° C., and more preferably (Tg+3) to (Tg+5) ° C. A specific temperature is, for example, 125 to 135° C., preferably 127 to 133° C., and more preferably 128 to 130° C.

From the viewpoint of easy preparation of a negative A-plate being a λ/4 plate (a λ/4 plate that has a negative Rth value, a −λ/4 plate, or a −1/4 wave plate), the stretching temperature is, for example, (Tg+5) to (Tg+15) ° C., preferably (Tg+8) to (Tg+13) ° C., and more preferably (Tg+10) to (Tg+12° C.) A specific temperature is, for example, 130 to 140° C., preferably 133 to 138° C., and more preferably 135 to 137° C.

In a case where the stretching temperature is excessively high or low with respect to the above-mentioned ranges, the resulting film not only may have a difficulty in obtaining a desired retardation but also may fail to be stretched uniformly or may be broken.

The stretching ratio for the free-end uniaxial stretching is not particularly limited to a specific one and is, for example, 1.1 to 10. A preferred range is, in a stepwise manner, 1.3 to 8, 1.5 to 6, 1.8 to 5, 2 to 4, 2 to 3, particularly 3, practically 2 to 5, more preferably 2.5 to 4.5, and more preferably 3 to 4. In a case where the stretching ratio is excessively low, the resulting film may fail to obtain a desired retardation. In a case where the stretching ratio is excessively high, the resulting film may have an excessively high retardation or may also be broken. However, the retardation film of the present invention has an excellent formability (film formability and stretchability) and also has a toughness, and thus the film is hard to break. Moreover, the film easily expresses a retardation and has a desired or sufficient retardation even in a thin film.

The stretching speed for the free-end uniaxial stretching may be, for example, about 0.1 to 1000 mm/min., representatively 1 to 800 mm/min. A preferred range is 10 to 500 mm/min., 30 to 300 mm/min., 50 to 200 mm/min., 70 to 180 mm/min., 80 to 160 mm/min., 90 to 150 mm/min., 100 to 140 mm/min., 105 to 135 mm/min., 110 to 130 mm/min., and more preferably 115 to 125 mm/min. in a stepwise manner. In a case where the stretching speed is excessively low, the resulting film may fail to obtain a desired retardation.

(Stretching Condition for Preparing Positive C-Plate)

The positive C-plate can be prepared by making stresses (or stress states) applied to both longitudinal and transverse directions of an in-plane film direction uniform (or by making orientation states in an in-plane two directions uniform). Specifically, the plate can be prepared by a method of equal stretching at substantially the same stretching speed in each direction in simultaneous biaxial stretching, a method of suitably adjusting stretching conditions such as stretching ratio, temperature, and speed in each direction in simultaneous or sequential biaxial stretching to make the orientation states substantially uniform, or other methods.

The biaxial stretching may be either a sequential biaxial stretching or a simultaneous biaxial stretching, and may practically be a simultaneous biaxial stretching. Examples of the stretching method may include a tenter stretching method, an inter-roll stretching method, a tube stretching method, and a combination thereof. For the sequential biaxial stretching, a film is practically subjected to longitudinal stretching by an inter-roll stretching and then subjected to transverse stretching by a tenter stretching. While the inter-roll stretching may cause neck-in or transcription of stains or scratches due to contact with the roll, the sequential biaxial stretching is preferred in light of excellent productivity. For the simultaneous biaxial stretching, while neck-in of a film may occur between clips at both ends of the film. The simultaneous biaxial stretching is preferred in light of easy formation of the positive C-plate by adjusting the in-plane retardation R0 to substantially zero.

For the biaxial stretching, the stretching temperature is, for example, (Tg−10) to (Tg+20) ° C., and is preferably in a stepwise manner (Tg−5) to (Tg+10) ° C., (Tg−3) to (Tg+5) ° C., (Tg+2) to (Tg+5) ° C., practically (Tg−2) to (Tg+15) ° C. in easy formation of a thinner film, for example, Tg to (Tg+15) ° C., preferably Tg to (Tg+8) ° C., and more preferably (Tg+5) to (Tg+7) ° C.) A specific temperature is, for example, 100 to 150° C., and is preferably in a stepwise manner 110 to 145° C., 120 to 140° C., 129 to 133° C., practically 123 to 140° C. in easy formation of a thinner film, preferably 125 to 132° C., and 130 to 132° C. In a case where the stretching temperature is excessively high or low with respect to the above-mentioned ranges, the resulting film not only may have a difficulty in obtaining a desired retardation but also may fail to be stretched uniformly or may be broken.

For the biaxial stretching, the stretching ratio in each of the longitudinal and transverse directions is, for example, 1.1 to 10, and a preferred range is, in a stepwise manner, 1.3 to 8, 1.5 to 6, 1.8 to 5, 2 to 4, 2 to 3, and practically 1.5 to 3. In light of easy formation of a positive C-plate, the stretching ratio is 1.6 to 2.5, preferably 1.7 to 2.3, more preferably 1.8 to 2.2, and particularly 1.9 to 2.1. In light of easy formation of the positive C-plate by adjusting the in-plane retardation R0 to substantially zero, it is preferred that the stretching ratios in the longitudinal and transverse directions be equal (equal stretching). In a case where the stretching ratio is excessively low, the resulting film may fail to obtain a desired retardation. In a case where the stretching ratio is excessively high, the resulting film may have an excessively high retardation or may be broken. However, the retardation film of the present invention is hard to break due to excellent formability and excellent toughness. Moreover, the film easily expresses a retardation and has a desired or sufficient retardation even in a thin film.

For the biaxial stretching, the stretching speed may be, for example, about 0.1 to 1000 mm/min., representatively 1 to 800 mm/min., and a preferred range is 10 to 500 mm/min., 30 to 300 mm/min., 50 to 200 mm/min., 70 to 180 mm/min., 80 to 160 mm/min., 90 to 150 mm/min., 100 to 140 mm/min., 105 to 135 mm/min., 110 to 130 mm/min., and more preferably 115 to 125 mm/min. in a stepwise manner. In light of easy formation of the positive C-plate by adjusting the in-plane retardation R0 to substantially zero, it is preferred that the stretching speeds in the longitudinal and transverse directions be the same. In a case where the stretching speed is excessively low, the resulting film may fail to obtain a desired retardation. In a case where the stretching speed is excessively high, the resulting film may be broken. However, the retardation film of the present invention is hard to break due to excellent formability and toughness. Moreover, the film easily expresses a retardation and has a desired or sufficient retardation even in a thin film.

(Stretching Condition for Preparing Positive B-Plate)

The positive B-plate can be prepared by providing a difference between a stress (or stress state) applied to a longitudinal direction of an in-plane film direction and that applied to a transverse direction thereof (or by providing a difference between an orientation state in an in-plane longitudinal direction and that in an in-plane transverse direction). The positive B-plate is practically prepared by the fixed-end uniaxial stretching or the biaxial stretching. The stretching method may be selected according to applications of the retardation film or others. Specifically, for preparation of a positive B-plate being a λ/2 plate (a λ/2 plate that has a negative Rth value, a −λ/2 plate, or a −1/2 wave plate) or a positive B-plate being a λ/4 plate (a λ/4 plate that has a negative Rth value, a −λ/4 plate, or a −1/4 wave plate), the fixed-end uniaxial stretching is practically used. For preparation of a retardation film suitable for a vertical-alignment (VA) liquid crystal display, the biaxial stretching, in particular the sequential biaxial stretching, is practically used.

The fixed-end uniaxial stretching is preferred compared with the free-end uniaxial stretching in light of less neck-in and easy adjustment of physical properties, and may be a longitudinal stretching that is a stretching in a machine direction of an unstretched film, a transverse stretching that is a stretching in a crosswise direction thereof, an oblique stretching that is a stretching in an oblique direction thereof, for example, a stretching in a direction having an angle of 45° with respect to the machine direction. The stretching method is practically a tenter stretching method. Moreover, the stretching method may be a wet stretching method. The stretching method is practically a dry stretching method in light of the relationship with the following stretching temperature.

For the fixed-end uniaxial stretching, the stretching temperature is, for example, (Tg−10) to (Tg+20) ° C., preferably (Tg−5) to (Tg+15) ° C., Tg to (Tg+10) ° C., (Tg+3) to (Tg+8) ° C., and more preferably (Tg+4) to (Tg+7) ° C. in a stepwise manner. A specific temperature is, for example, 100 to 150° C., preferably 120 to 145° C., 125 to 140° C., 126 to 135° C., 128 to 133° C., and more preferably 129 to 132° C. in a stepwise manner.

From the viewpoint of easy preparation of the positive B-plate being a λ/2 plate, the stretching temperature is, for example, Tg to (Tg+10) ° C., preferably (Tg+1) to (Tg+8) ° C., more preferably (Tg+2) to (Tg+6) ° C., and further preferably (Tg+3) to (Tg+5) ° C. A specific temperature is, for example, 125 to 135° C., preferably 126 to 133° C., more preferably 127 to 131° C., and further preferably 128 to 130° C.

From the viewpoint of easy preparation of the positive B-plate being a λ/4 plate, the stretching temperature is, for example, (Tg+3) to (Tg+13) ° C., preferably (Tg+4) to (Tg+11) ° C., more preferably (Tg+5) to (Tg+9) ° C., and further preferably (Tg+6) to (Tg+8) ° C.) A specific temperature is, for example, 128 to 138° C., preferably 129 to 136° C., more preferably 130 to 134° C., and further preferably 131 to 133° C.

In a case where the stretching temperature is excessively high or low with respect to the above-mentioned ranges, the resulting film not only may have a difficulty in obtaining a desired retardation but also may fail to be stretched uniformly or may be broken.

For the fixed-end uniaxial stretching, the stretching ratio is not particularly limited to a specific one. The stretching ratio is, for example, 1.1 to 10, and a preferred range is 1.2 to 8, 1.5 to 5, 1.8 to 4, 2 to 3, and more preferably 2 to 2.5 in a stepwise manner.

From the viewpoint of easy preparation of the positive B-plate being a λ/2 plate, the stretching ratio is, for example, 1.5 to 3.5, preferably 1.7 to 3.3, more preferably 2 to 3, further preferably 2.2 to 2.8, especially 2.3 to 2.7, and particularly 2.4 to 2.6.

From the viewpoint of easy preparation of the positive B-plate being λ/4 plate, the stretching ratio is, for example, 1.1 to 3, preferably 1.3 to 2.7, more preferably 1.5 to 2.5, further preferably 1.7 to 2.3, especially 1.8 to 2.2, and particularly 1.9 to 2.1.

In a case where the stretching ratio is excessively low, the resulting film may fail to obtain a desired retardation. In a case where the stretching ratio is excessively high, the resulting film may have an excessively high retardation or may also be broken. However, the retardation film of the present invention has an excellent formability (film formability and stretchability) and also has an excellent toughness, the film is hard to break. Moreover, the film easily expresses a retardation and has a desired or sufficient retardation even in a thin film.

For the uniaxial stretching, the stretching speed may be, for example, about 0.1 to 1000 mm/min., representatively 1 to 800 mm/min., and a preferred range is 10 to 500 mim/min., 30 to 300 mm/min., 50 to 200 mm/min., 70 to 180 mm/min., 80 to 160 mm/min., 90 to 150 mm/min., 100 to 140 mm/min., 105 to 135 mm/min., 110 to 130 mm/min., and more preferably 115 to 125 mm/min. in a stepwise manner. In a case where the stretching speed is excessively low, the resulting film may fail to obtain a desired retardation.

The biaxial stretching may be any simultaneous or sequential biaxial stretching that stretching conditions are adjusted so as to have different orientation states in two directions. The biaxial stretching is practically a sequential biaxial stretching. Examples of the stretching method may include a tenter stretching method, an inter-roll stretching method, a tube stretching method, and a combination thereof. For the sequential biaxial stretching, a film is practically subjected to longitudinal stretching by an inter-roll stretching and then subjected to transverse stretching by a tenter stretching.

For the biaxial stretching, the stretching temperature may be, for example, about (Tg−10) to (Tg+15) ° C. From the viewpoint of easy preparation of a retardation film suitable for a vertical-alignment (VA) liquid crystal display, the stretching temperature is preferably (Tg−5) to (Tg+10) ° C., Tg to (Tg+7) ° C., (Tg+1) to (Tg+5) ° C., and more preferably (Tg+2) to (Tg+4) ° C. in a stepwise manner. A specific temperature is, for example, 100 to 150° C., and is preferably 110 to 145° C., 115 to 140° C., 120 to 135° C., 1.25 to 132° C., 126 to 130° C., and more preferably 127 to 1.29° C. in a stepwise manner. For the sequential biaxial stretching, a temperature in one stretching may be different from that in the other stretching, and is practically the same as that in the other stretching. In a case where the stretching temperature is excessively high or low with respect to the above-mentioned ranges, the resulting film not only may have a difficulty in obtaining a desired retardation but also may fail to be stretched uniformly or may be broken.

For the biaxial stretching, the stretching ratio may be, for example, about 1.1 to 10 in each of the longitudinal and transverse directions. From the viewpoint of easy preparation of a retardation film suitable for a vertical-alignment (VA) liquid crystal display, a preferred range is 1.2 to 8, 1.3 to 5, 1.4 to 3, and 1.5 to 2 in a stepwise manner. In a case where the stretching ratio is excessively low, the resulting film may fail to obtain a desired retardation. In a case where the stretching ratio is excessively high, the resulting film may have an excessively high retardation or may also be broken. However, the retardation film of the present invention has an excellent formability and also has an excellent toughness, the film is hard to break. Moreover, the film easily expresses a retardation and has a desired or sufficient retardation even in a thin film.

Moreover, the stretching ratios in both longitudinal and transverse directions may be equal (equal stretching). The stretching ratios in both longitudinal and transverse directions are practically different from each other (biased stretching). For the biased stretching, a ratio between the stretching ratios in the longitudinal and transverse directions (a ratio of a larger stretching ratio relative to a smaller stretching ratio in the longitudinal and transverse directions) may be, for example, about 1.01 to 10. From the viewpoint of easy preparation of a retardation film suitable for a vertical-alignment (VA) liquid crystal display, a preferred range is 1.05 to 3, 1.1 to 2, 1.15 to 1.5, 1.18 to 1.3, and more preferably 1.2 to 1.25 in a stepwise manner. In a case where the ratio between the stretching ratios in the longitudinal and transverse directions is excessively low or high, the resulting film may fail to obtain a desired retardation.

For the biaxial stretching, the stretching speed may be, for example, about 0.1 to 1000 mm/min., representatively 1 to 800 mm/min., and a preferred range is 10 to 500 mm/min., 30 to 300 mm/min., 50 to 200 mm/min., 70 to 180 mm/min., 80 to 160 mm/min., 90 to 150 mm/min., 100 to 140 mm/min., 105 to 135 mm/min., 110 to 130 mm/min., and more preferably 115 to 125 mm/min in a stepwise manner. In light of productivity, it is preferred that the stretching speeds in the longitudinal and transverse directions be the same. In a case where the stretching speed is excessively low, the resulting film may fail to obtain a desired retardation. In a case where the stretching speed is excessively high, the resulting film may be broken. However, the retardation film of the present invention has excellent formability and toughness, the film is hard to break. Moreover, the film easily expresses a retardation and has a desired or sufficient retardation even in a thin film.

If necessary, to the retardation film may be laminated any other film (or coating layer) unless the effects of the present invention are damaged. For example, a polymer layer containing a surfactant, a release agent, or a fine particle may be coated on the surface of the retardation film to form a slippery layer.

Thus obtained retardation film (the negative A-plate, the positive C-plate, or the positive B-plate) has an excellent toughness and can be formed into a thin film. Thus, the thickness (or average thickness) of the retardation film is, for example, 5 to 200 μm, and a preferred range is, in a stepwise manner, 5 to 150 μm, 5 to 100 μm, 10 to 80 μm, 15 to 70 μm, 20 to 60 μm, 25 to 55 μm, 30 to 50 μm, 33 to 45 μm, practically 10 to 50 μm, preferably 15 to 45 μm, more preferably 18 to 40 μm, further preferably 20 to 35 μm, especially 22 to 30 μm, and particularly 24 to 28 μm. The retardation film of the present invention has a large or sufficient retardation even in a thin film. The average thickness can be measured according to the method described in the after-mentioned Examples.

According to the present invention, since a stretched film is formed of the specific polyester resin under the stretching conditions, a negative A-plate, a positive C-plate or a positive B-plate, each having a negative intrinsic birefringence, preferably a positive C-plate or a positive B-plate, can be produced. In a case where the retardation film is a negative A-plate, the negative A-plate is preferably a $-\lambda/2$ plate or a $-\lambda/4$ plate. In a case where the retardation film is a positive B-plate, the positive B-plate may be a $-\lambda/2$ plate or a $-\lambda/4$ plate according to the applications. Incidentally, commonly used $\lambda/2$ plate and $\lambda/4$ plate are a positive A-plate, that is, a retardation film that satisfies the relational expression represented by nx>ny=nz (wherein nx, ny and nz have the same meanings as defined above), or a negative B-plate, that is, a retardation film that satisfies the relational expression represented by nx>ny>nz (wherein nx, ny and nz have the same meanings as defined above), and such $\lambda/2$ plate and $\lambda/4$ plate have a positive Rth value.

In these retardation films, the in-plane retardation (or a retardation in a plane direction) R0(550) at a temperature of 20° C. and a wavelength of 550 nm for the negative A-plate may be selected from a range of, for example, about 100 to 350 nm, and is preferably 120 to 300 nm. The above-mentioned in-plane retardation R0(550) for the negative A-plate being a $\lambda/2$ plate (or a $-\lambda/2$ plate) is, for example, 260 to 290 nm, preferably 265 to 285 nm, and more preferably 270 to 280 nm. The above-mentioned in-plane retardation R0(550) for the negative A-plate being a $\lambda/4$ plate (or a $-\lambda/4$ plate) is, for example, 1.15 to 160 nm, preferably 124 to 151 nm, and more preferably 130 to 145 nm.

For the positive 0-plate, the above-mentioned in-plane retardation P0(550) is, for example, 0 to 10 nm, preferably 0 to 9 nm, and more preferably 0 to 8 nm.

For the positive B-plate, the above-mentioned in-plane retardation R0(550) may be selected from a range of, for example, about 40 to 300 nm, and is preferably 50 to 290 nm. For the positive B-plate being a $\lambda/2$ plate (or a $-\lambda/2$ plate), the above-mentioned in-plane retardation R0(550) is, for example, 260 to 290 nm, preferably 265 to 285 nm, and more preferably 270 to 280 nm. For the positive B-plate being a $\lambda/4$ plate (or a $-\lambda/4$ plate), the above-mentioned in-plane retardation R0(550) is, for example, 115 to 160 nm, preferably 124 to 151 nm, more preferably 125 to 150 nm, and further preferably 130 to 145 nm. In a case where the positive B-plate is a retardation film suitable for a vertical-alignment (VA) liquid crystal display, the above-mentioned in-plane retardation R0(550) is, for example, 40 to 75 nm, preferably 45 to 70 nm, and more preferably 50 to 65 nm.

In the retardation film, the thickness-direction retardation (or a retardation in a thickness direction) Rth(550) at a temperature of 20° C. and a wavelength of 550 nm is any negative value without particular limitation, and is suitably adjusted by the stretching conditions, the thickness of the film, or others. For example, in a case where the retardation film of the present invention is laminated to one or a plurality of other optical film(s) and the resulting product is used as a laminate (or an optical member) is used, it is preferred that the Rth of the laminate as a whole be adjusted to approach zero by combination of the retardation film of the present invention with other optical film(s) that usually has a positive Rth value. That is, the retardation film of the present invention can suitably be used as a retardation film for adjusting the Rth in the laminate. A representative Rth(550) in the retardation film of the present invention may be selected from a range of, for example, about −250 to −10 nm, specifically about −200 to −30 nm, and a preferred range is −190 to −40 nm, −180 to −50 nm, −170 to −60 nm, −150 to −70 nm, −130 to −75 nm, −100 to −80 nm, and particularly −90 to −85 nm in a stepwise manner.

The in-plane retardation R0 and the thickness-direction retardation Rth are defined by the following equations and can be measured according to the methods described in the after-mentioned Examples:

$$R0=(nx-ny)\times d$$

$$Rth=\{(nx+ny)/2-nz\}\times d$$

wherein d represents an average thickness of a retardation film, and nx, ny and nz have the same meanings as defined in the above-mentioned formulae (4) to (6).

Each of the negative A-plate, the positive C-plate and the positive B-plate of the present invention can be laminated to a retardation film having a positive Rth value such as a positive A-plate, and the obtained laminate can suitably be used as a viewing-angle compensation plate of a liquid crystal display. Moreover, the positive C-plate can be laminated to a circularly polarizing plate of an organic electroluminescent (EL) display, and the obtained laminate can suitably be used as a viewing-angle compensation plate.

EXAMPLES

The following examples are intended to describe this invention in further detail and should by no means be interpreted as defining the scope of the invention. The evaluation items are shown below.

[Evaluation Method]

(Glass Transition Temperature Tg)

A differential scanning calorimeter (manufactured by Seiko Instruments Inc., "DSC 6220") was used to measure Tg of a sample placed in an aluminum pan at a range of 30° C. to 200° C.

(Molecular Weight)

A gel permeation chromatography (manufactured by Tosoh Corporation, "HLC-8120GPC") was used to measure a weight-average molecular weight Mw of a sample dissolved in chloroform in terms of polystyrene.

(In-Plane Retardation R0(550), Thickness-Direction Retardation Rth(550))

A retardation measuring apparatus ("RETS-100" manufactured by Otsuka Electronics Co., Ltd.) was used to measure R0(550) and Rth(550) of a stretched film at a measuring temperature of 20° C. and a wavelength of 550 nm.

(Average Thickness)

A thickness gage ("Micrometer" manufactured by Mitutoyo Corporation) was used to measure a thickness of a film at three (3) points at equal intervals with respect to a machine (or longitudinal) direction of the film between chucks to be used for stretching, and the average of the three measurements was calculated.

[Raw Materials]

FDPM: 9,9-bis(2-methoxylcarbonylethyl) fluorene [dimethyl ester of 9,9-bis(2-carboxyethyl)fluorene (or fluorene-9,9-dipropionic acid)], which was synthesized in the same manner as described in Example 1 of Japanese Patent Application Laid-Open Publication No. 2005-89422 except that t-butyl acrylate was changed to methyl acrylate [37.9 g (0.44 mol)]

DMT: dimethyl terephthalate

BPEF: 9,9-bis[4-(2-hydroxyethoxy)phenyl]fluorene, manufactured by Osaka Gas Chemicals Co., Ltd.

EG: ethylene glycol

Synthesis Example 1

To 1.00 mol of FDPM, 0.80 mol of BPEF, and 2.20 mol of EG were added $2 \times 10^{-4}$ mol of manganese acetate tetrahydrate and $8 \times 10^{-4}$ mol of calcium acetate monohydrate as transesterification catalysts, and the resulting mixture was gradually heat-melted while stirring. After the mixture was heated to 230° C., $14 \times 10^{-4}$ mol of trimethyl phosphate and $20 \times 10^{-4}$ mol of germanium oxide were added thereto. EG was removed from the resulting mixture while the mixture was gradually heated and depressurized to reach 270° C. and not more than 0.13 kPa. After reached a predetermined stirring torque, the content was removed from the reactor and was prepared to give a polyester resin 1 pellet.

A $^1$H-NMR analysis of the resulting pellet found that 1001 by mol of the dicarboxylic acid component introduced to the polyester resin 1 was derived from FDPM, 80% by mol of the diol component introduced thereto was derived from BPEF, and 20% by mol of the diol component introduced thereto was derived from EG.

The polyester resin 1 had a glass transition temperature Tg of 125° C. and a weight-average molecular weight Mw of 66500.

Examples 1 to 0.1

The polyester resin 1 produced in Synthesis Example 1 was melt-extruded at a temperature of 260° C. using a twin-screw extruder ("KZW15-33MG" manufactured by TECHNOVEL CORPORATION, L/D=45, screw diameter D: 15 mm, rotational speed: 200 rpm) to give an unstretched film having an average thickness of 50 μm, 80 μm, or 100 μm using T-die and winding apparatus. For each film obtained, the film was cut into a size of 60 mm×60 mm, and the cut film was uniaxially or biaxially stretched at the stretching method, the stretching temperature and the stretching ratio described in Table 1 and at a stretching speed of 120 mm/min. using a stretching apparatus ("Biaxial film stretcher IMC-1A97" manufactured by Imoto machinery Co., Ltd.) to give a stretched film. For Examples 10 and 11 subjected to biaxial stretching, the stretching was carried out at a stretching speed of 120 mm/min. in each direction. The R0(550), Rth(550), and average thickness of the resulting stretched films are shown in Table 1.

Examples 12 to 15

The polyester resin 1 produced in Synthesis Example 1 was melt-extruded at a temperature of 260° C. using a twin-screw extruder ("KZW15-30MG" manufactured by TECHNOVEL CORPORATION, L/D=45, screw diameter D: 15 mm, rotational speed: 200 rpm) to give an unstretched film having an average thickness of 125 μm, 100 μm, 80 μm, or 135 μm using T-die and winding apparatus. For each film obtained, the film was cut into a size of 60 mm×60 mm, and the cut film was uniaxially or biaxially stretched at the stretching method, the stretching temperature and the stretching ratio described in Table 1 and at a stretching speed of 120 mm/min. using a stretching apparatus ("Biaxial film stretcher IMC-1A97" manufactured by Imoto machinery Co., Ltd.) to give a stretched film. For Examples 14 and 15 subjected to sequential biaxial stretching, the stretching was carried out at the same stretching temperature (128° C.) and at the same stretching speed (120 mm/min.) in each direction. The R0(550), Rth(550), and average thickness of the resulting stretched films are shown in Table 1.

Synthesis Example 21

A polyester resin 2 was prepared in the same manner as Synthesis Example 1 except that 1.00 mol of DMT was used instead of FDPM as the dicarboxylic acid component and that 0.70 mol of BPEF and 2.30 mol of EG were used as the diol component. A $^1$H-NMR analysis of the resulting pellet found that 100% by mol of the dicarboxylic acid component introduced to the polyester resin 2 was derived from DMT, 70% by mol of the diol component introduced thereto was derived from BPEF, and 30% by mol of the diol component introduced thereto was derived from EG.

The resulting polyester resin 2 had a glass transition temperature Tg of 142° C. and a weight-average molecular weight Mw of 45700.

Comparative Examples 1 to 11

Stretched films were produced in the same manner as Examples 1 to 11 except that an unstretched film having an average thickness of 100 μm was formed from the polyester resin 2 obtained in Synthesis Example 2 and that the stretching was carried out under the stretching conditions described in Table 1. The R3(550), Rth(550), and average thickness of the resulting stretched films are shown in Table 2.

As apparent from Tables 1 and 2, all stretched films prepared in Examples had a negative value of a thickness-direction retardation Rth. For Examples 1 to 9 subjected to free-end uniaxial stretching, negative A-plates were obtained; for Examples 10 and 11 subjected to equal stretching in simultaneous biaxial stretching, positive C-plates were obtained; and for Examples 12 to 15 subjected to fixed-end uniaxial stretching or biased stretching in sequential biaxial stretching, positive B-plates were obtained. Some Comparative Examples showed film breakage by stretching. In contrast, Examples unexpectedly allowed film formation and stretching to form thin films without film breakage and showed a high formability in spite of a high proportion of a constitutional unit having a rigid fluorene skeleton. Further, the obtained stretched films had a reasonable mechanical

TABLE 1

| | Unstretched film | | | | | Stretched film | | | | | |
|---|---|---|---|---|---|---|---|---|---|---|---|
| | Composition of polyester (molar ratio) | | | | Tg | Average thickness | Stretching condition | | | R0 (550) | Rth (550) | Average thickness |
| | FDPM | DMT | BPEF | EG | (° C.) | (μm) | Method | Temperature (° C.) | Stretching ratio | (nm) | (nm) | (μm) |
| Example 1 | 1.0 | 0 | 0.8 | 0.2 | 125 | 50 | Free-end uniaxial | 129 | 3.0 | 272 | ~140 | 29 |
| Example 2 | | | | | | 50 | | | 3.5 | 279 | ~147 | 26 |
| Example 3 | | | | | | 50 | | | 4.0 | 324 | ~164 | 25 |
| Example 4 | | | | | | 50 | | 131 | 3.0 | 151 | ~81 | 25 |
| Example 5 | | | | | | 50 | | | 3.5 | 236 | ~124 | 24 |
| Example 6 | | | | | | 50 | | | 4.0 | 282 | ~143 | 24 |
| Example 7 | | | | | | 80 | | 136 | 3.0 | 143 | ~76 | 39 |
| Example 8 | | | | | | 80 | | | 3.5 | 183 | ~93 | 36 |
| Example 9 | | | | | | 80 | | | 4.0 | 190 | -94 | 35 |
| Example 10 | | | | | | 100 | Simultaneous biaxial | 126 | 2.0 × 2.0 | 5 | ~165 | 42 |
| Example 11 | | | | | | 100 | | 131 | 2.0 × 2.0 | 8 | ~87 | 26 |
| Example 12 | | | | | | 125 | Fixed-end uniaxial | 129 | 2.5 | 281 | ~224 | 50 |
| Example 13 | | | | | | 100 | | 132 | 2.0 | 142 | ~143 | 50 |
| Example 14 | | | | | | 80 | Sequential biaxial | 128 | 2.0 × 1.6 | 54 | ~136 | 25 |
| Example 15 | | | | | | 135 | | 128 | 1.8 × 1.5 | 61 | ~188 | 20 |

TABLE 2

| | Unstretched film | | | | | Stretched film | | | | | |
|---|---|---|---|---|---|---|---|---|---|---|---|
| | Composition of polyester (molar ratio) | | | | Tg | Average thickness | Stretching condition | | | R0 (550) | Rth (550) | Average thickness |
| | FDPM | DMT | BPEF | EG | (° C.) | (μm) | Method | Temperature (° C.) | Stretching ratio | (nm) | (nm) | (μm) |
| Comparative Example 1 | 0 | 1.0 | 0.7 | 0.3 | 142 | 100 | Free-end uniaxial | 146 | 3.0 | 833 | 421 | 51 |
| Comparative Example 2 | | | | | | 100 | | | 3.5 | | Broken | |
| Comparative Example 3 | | | | | | 100 | | | 4.0 | | Broken | |
| Comparative Example 4 | | | | | | 100 | | 148 | 3.0 | 702 | 378 | 48 |
| Comparative Example 5 | | | | | | 100 | | | 3.5 | 716 | 363 | 47 |
| Comparative Example 6 | | | | | | 100 | | | 4.0 | | Broken | |
| Comparative Example 7 | | | | | | 100 | | 150 | 3.0 | 597 | 291 | 56 |
| Comparative Example 8 | | | | | | 100 | | | 3.5 | 655 | 323 | 51 |
| Comparative Example 9 | | | | | | 100 | Simultaneous biaxial | 143 | 2.0 × 2.0 | | Broken | |
| Comparative Example 10 | | | | | | 100 | | 147 | 2.0 × 2.0 | 49 | 224 | 28 |
| Comparative Example 11 | | | | | | 100 | | 150 | 2.0 ×2.0 | 28 | 201 | 27 | strength such as toughness in spite of soft (flexible) and thin, and had an excellent handleability even in a single-layer structure. In particular, for Examples 10 to 15, although fixed-end uniaxial stretching or biaxial stretching which is difficult in stable formation compared with free-end uniaxial stretching was conducted, that is, although a stress is substantially applied to both machine direction and crosswise direction, thin stretched films having an excellent handleability were produced without film breakage, which was especially surprising.

Moreover, although the stretched films obtained in Examples were thin, the stretched films had a sufficient retardation as a retardation film and had a high glass transition temperature Tg and an excellent heat resistance. Among these Examples, Examples 1, 2 and 6 were suitable for a $-\lambda/2$ plate (a negative A-plate being a $\lambda/2$ plate), Examples 4 and 7 were suitable for a $-\lambda/4$ plate (a negative A-plate being a $\lambda/4$ plate), and Examples 10 and 11, in particular Example 11 in light of thinness, were suitable for a positive C-plate. Moreover, Example 12 was suitable for a $-\lambda/2$ plate (a positive B-plate being a $\lambda/2$ plate), Example 13 was suitable for a $-\lambda/4$ plate (a positive B-plate being a $\lambda/4$ plate), and Examples 0.14 and 15, in particular Example 14 in light of thinness, were particularly suitable as a retardation film for a vertical-alignment (VA) liquid crystal display.

INDUSTRIAL APPLICABILITY

The retardation film of the present invention has a high heat resistance, an excellent mechanical property such as softness (flexibility) or toughness, and a high handleability. Moreover, due to an excellent formability, the retardation film can be made thin, and even such a thin film has a sufficient retardation. Further, since the retardation film has a negative value of a thickness-direction retardation Rth, the retardation film as a negative A-plate, a positive C-plate, or a positive B-plate can be laminated to a polarizing plate to impart a viewing-angle compensation function to thus obtained laminate. Thus, the retardation film is suitably used for an image display device provided with the polarizing plate, for example, a reflective liquid crystal display device, a semi-transmissive liquid crystal display device, and an organic electroluminescent (EL) display device.

The invention claimed is:

1. A retardation film comprising a stretched film of a polyester resin containing a diol unit (A) and a dicarboxylic acid unit (B), wherein
the diol unit (A) contains a first diol unit ($A^1$) having a fluorene skeleton represented by the following formula (1):

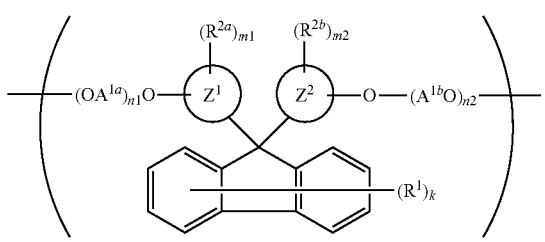

wherein $Z^1$ and $Z^2$ independently represent an aromatic hydrocarbon ring, $R^1$, $R^{2a}$ and $R^{2b}$ independently represent a substituent, k denotes an integer of 0 to 8, m1, m2, n1 and n2 independently denote an integer of not less than 0, and $A^{1a}$ and $A^{1b}$ independently represent a straight-chain or branched-chain alkylene group,
the dicarboxylic acid unit (B) contains a dicarboxylic acid unit (B1) having a fluorene skeleton represented b the following formula 2a or (2b):

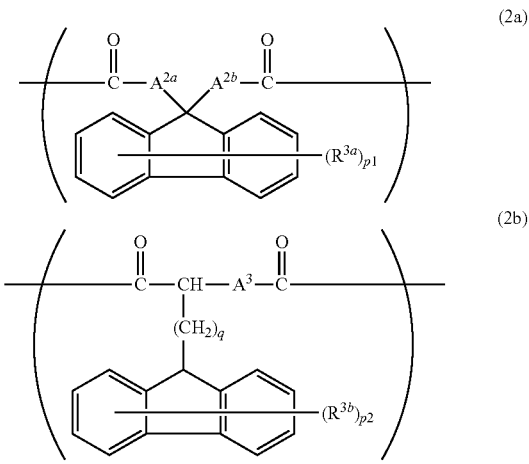

wherein $R^{3a}$ and $R^{3b}$ independently represent a substituent, p1 and p2 independently denote an integer of 0 to 8, q denotes an integer of 0 to 4, and $A^{2a}$, $A^{2b}$ and $A^3$ independently represent a divalent hydrocarbon group which may have a substituent,
a proportion of the dicarboxylic acid unit (B1) relative to the total dicarboxylic acid unit (B) is not less than 90% by mol, and a proportion of the total amount of the first diol unit ($A^1$) and the dicarboxylic acid unit (B1) relative to the total constitutional units of the polyester resin is not less than 85% by mol,
wherein a weight-average molecular weight Mw of the polyester resin is a range from 50000 to 1000000,
wherein the retardation film is free from other thermoplastic resins, is a positive C-plate or a positive B-plate, and
has an average thickness of 10 to 60 μm.

2. The retardation film according to claim 1, wherein the diol unit (A) further contains a second diol unit ($A^2$) represented by the following formula (3):

wherein $A^4$ represents a straight-chain or branched-chain alkylene group, and r denotes an integer of not less than 1,
a ratio of the first diol unit ($A^1$) relative to the second diol unit ($A^2$) is 50/50 to 99/1 in terms of the former/the latter (molar ratio).

3. The retardation film according to claim 1, wherein, in the formula (1), $Z^1$ and $Z^2$ are independently a benzene ring or a naphthalene ring, $R^{2a}$ and $R^{2b}$ are independently an alkyl group or an aryl group, m1 and m2 are independently an integer of 0 to 2, $A^{1a}$ and $A^{1b}$ are independently a $C^{2-4}$alkylene group, and n1 and n2 are independently an integer of 1 to 10, the dicarboxylic acid unit (B1) contains at least a unit represented by the formula (2a), in which $A^{2a}$ and $A^{2b}$ are independently a straight-chain or branched-chain $C^{2-4}$alkylene group, and a proportion of the first diol unit ($A^1$) relative to the total diol units (A) is not less than 75% by mol, the proportion of the dicarboxylic acid unit (B1) relative to the total dicarboxylic acid units (B) is not less than 95% by mol, and the proportion of the total amount of the first diol unit ($A^1$) and the dicarboxylic acid unit (B1) relative to the total constitutional units of the polyester resin is not less than 87% by mol.

4. The retardation film according to claim 1, which is the positive C-plate having an in-plane retardation R0(550) of 0 to 10 nm at a temperature of 20° C. and a wavelength of 550 nm.

5. The retardation film according to claim 1, which is any one selected from the group consisting of
the positive B-plate being a λ/4 plate having an in-plane retardation R0(550) of 115 to 160 nm at a temperature of 20° C. and a wavelength of 550 nm,
the positive B-plate being a λ/2 plate having an in-plane retardation R0(550) of 260 to 290 nm at a temperature of 20° C. and a wavelength of 550 nm, and
the positive B-plate having an in-plane retardation R0(550) of 40 to 75 nm at a temperature of 20° C. and a wavelength of 550 nm.

6. The retardation film according to claim 1, which has a thickness-direction retardation Rth(550) of −200 to −30 nm at a temperature of 20° C. and a wavelength of 550 nm.

7. A method for producing a retardation film recited in claim 1, which comprises fixed-end uniaxially or biaxially stretching an unstretched film comprising the polyester resin recited in claim 1 under the following conditions:
average thickness of the unstretched film: 10 to 1000 μm
stretching temperature: (Tg−10) to (Tg+20) ° C., wherein Tg represents a glass transition temperature of the polyester resin
stretching speed: 0.1 to 1000 mm/min
stretching ratio: 1.1 to 10 in fixed-end uniaxial stretching or 1.1 to 10 in each direction in biaxial stretching.

8. The method according to claim 7, wherein the stretching is carried out under the following conditions:
average thickness of the unstretched film: 30 to 200 μm
stretching temperature: Tg to (Tg+15)° C.
stretching speed: 10 to 500 mm/min
stretching ratio: 2 to 5 in fixed-end uniaxial stretching or 1.5 to 3 in each direction in biaxial stretching.

9. The method according to claim 7, wherein the biaxial stretching is carried out under the same stretching ratio in each direction.

* * * * *